Oct. 25, 1966 C. F. AULT ET AL 3,281,807

INFORMATION RECORDING SYSTEM

Filed March 21, 1963 11 Sheets-Sheet 1

INVENTORS C. F. AULT
D. FRIEDMAN
R. H. GRANGER
J. J. MADDEN

BY Kenneth B. Hamlin

ATTORNEY

Oct. 25, 1966 C. F. AULT ET AL 3,281,807

INFORMATION RECORDING SYSTEM

Filed March 21, 1963 11 Sheets-Sheet 2

INFORMATION RECORDING SYSTEM

Filed March 21, 1963 11 Sheets-Sheet 6

INFORMATION RECORDING SYSTEM

Oct. 25, 1966 C. F. AULT ET AL 3,281,807

INFORMATION RECORDING SYSTEM

Filed March 21, 1963 11 Sheets-Sheet 10

3,281,807
INFORMATION RECORDING SYSTEM

Cyrus F. Ault, Lincroft, David Friedman, Red Bank, Robert H. Granger, Parsippany, and James J. Madden, Middletown, N.J., assignors to Bell Telephone Laboratories, Incorporated, New York, N.Y., a corporation of New York Filed Mar. 21, 1963, Ser. No. 266,962
20 Claims. (Cl. 340—174.1)

This invention relates to information storage systems and more particularly to apparatus for recording information on pluralities of information storage cards for use in such systems.

Currently, there are an increasing number of systems and circuit arrangements employing large pluralities of movable cards or sheets upon which electrical or magnetic elements are located. This is particularly apparent in the areas of information handling and information storage wherein movable cards are being advantageously utilized having electrical or magnetic storage elements printed or attached thereon. For example, illustrative information storage arrangements utilizing pluralities of movable memory cards upon which magnetic storage elements are located may be found in S. M. Shackell application Serial No. 708,127, filed January 10, 1958, and in an article entitled "A Card-Changeable Permanent-Magnet-Twistor Memory of Large Capacity," published in the "I.R.E. Transactions on Electronic Computers," vol. EC–10, pages 451–461, September 1961.

The advantages of using movable cards in information storage arrangements are becoming well known. Thus, these cards may be readily and economically manufactured in large quantities, they are relatively easy to handle and they can be easily and compactly stored until their use is desired. Moreover, movable cards may be removed easily and replaced, permitting desired changes to be made in the information stored in the memory quickly and accurately with a minimal requirement for specially trained personnel therefor.

The memory cards employed in information storage systems are often of a type having information permanently stored thereon, requiring separate cards to be constructed for each pattern of stored information to be used. Where changes are frequently made in the information stored in the system, however, it is more advantageous to employ memory cards which are similar to each other in construction and which are of a nature permitting the information stored thereon to be erased and new information to be recorded thereon in accordance with the desired changes. Thus, in the above-mentioned "I.R.E. Transactions" article, for example, the movable memory cards may be of similar construction, each having a plurality of small bar magnets bonded or deposited thereon and arranged in coordinate rows and columns. The cards are situated in the memory such that each bar magnet is in the proximity of a respective magnetic memory crosspoint. The magnetic crosspoints are bit addresses of wire memory elements of the type disclosed in the copending application of A. H. Bobeck, Serial No. 675,522, filed August 1, 1957, now U.S. Patent 3,083,353, which wire memory elements are generally known as twistors. A bar magnet may be in a nonmagnetized condition having substantially no static magnetic field; or it may be in a magnetized condition such that the respective memory crosspoint is biased by the static magnetic field of the magnet. When an interrogaton signal is applied to a memory crosspoint in the absence of a static magnetic field, an output signal is generated representative of a bit of information of one binary character. The presence of a static magnetic field due to a bar magnet in a magnetized condition, however, inhibits generation of an output signal from a crosspoint, which is representative of a bit of the other binary character. Accordingly, information is stored in the memory by selectively magnetizing the card magnets in a pattern in accordance with the binary bits of information to be stored.

When it is desired to change all or part of the information stored on a card, the card is usually bulk treated such that each of the magnets thereon is left in a nonmagnetized condition. The new information, along with any of the prior information that is unchanged, is then stored on the card by energizing an electromagnetic record transducer which is positioned adjacent each bar magnet to be placed in a magnetized condition. However, in those instances where only a part of the prior information is to be changed, and particularly where such changes are to be made frequently, it is not practicable to first bulk treat all of the bar magnets to place them in a nonmagnetized condition. One reason is that this requires a separate record of the unchanged prior information which is to be restored on the card. Therefore, it is desirable to record information on the cards and to make changes in the stored information by selectively magnetizing and demagnetizing only those bar magnets wherein the prior information condition is to be changed.

Further, heretofore the individual memory cards have generally been manually handled and positioned individually for recording purposes. This becomes less desirable as the quantity of cards used increases inasmuch as it requires considerable time and energy, thereby detracting from the advantages for using movable memory cards. Manual manipulation of the cards is also a major source of error in the recording of information thereon. Moreover, manual handling of the cards tends to decrease their life and gives rise to additional errors due to the storage elements thereon being damaged or dislocated. Therefore, it is desirable to provide apparatus for recording information on memory cards automatically without the need for manual manipulations. It is further desirable that such automatic recording apparatus be capable of rapidly and accurately recording information on large pluralities of such cards.

Accordingly, it is an object of this invention to provide a simple, compact and economical information recording arrangement for magnetically recording information on cards which may be utilized in information storage systems.

Another object of this invention is to provide an information recording arrangement for accurately storing information in a plurality of discrete storage elements located on a card.

It is a further object of this invention to provide an information recording arrangement for selectively magnetizing and demagnetizing pluralities of discrete magnetic elements.

A still further object of this invention is to provide apparatus for recording information on a plurality of storage cards automatically to minimize the necessity for manual manipulation of the cards.

In an illustrative embodiment of the present invention, the foregoing and other objects are attained in an information recording system which individually processes a plurality of information storage cards automatically, selectively magnetizing or demagnetizing each of a plurality of discrete magnetic storage elements located on the individual cards. The cards are individually withdrawn from a magazine and positioned adjacent the path of a plurality of movable transducer heads, each transducer head moving at a relatively constant velocity adjacent a column of the storage elements located on the card. During relative movement between the transducer heads and the card, the heads are each energized selectively to magnetize or to demagnetize the respective storage elements adjacent thereto in a pattern corresponding to the information to be stored on the card.

In accordance with one aspect of the present invention, as the transducers move adjacent a row of storage elements on the card, position sensing apparatus requests a word of information to be recorded and energizes circuitry for applying demagnetizing current in common to each of the transducers. After a predetermined interval of time the demagnetizing current applied to those particular transducers adjacent storage elements to be magnetized in accordance with the information being recorded is selectively modified, thereby producing a large magnetizing current pulse in those particular transducers. Thereafter, current flow is inhibited in those transducers adjacent the magnetized storage elements and the demagnetizing current is caused to persist in the other transducers until the transducers are no longer adjacent the particular row of storage elements. When all of the storage elements on a card have been processed in this manner, the transducers are returned to their initial position, the processed card is reinserted into the magazine, and another card is withdrawn and positioned for processing. Operation of the position sensing apparatus is inhibited during the return of the transducers to their initial position and until the transducers are again employed for information recording.

Magnet card memories commonly contain a plurality of cards arranged such that the magnet-bearing surfaces thereof alternately face opposite directions. Thus the cards in a memory may be divided into two interleaved groups with respect to the direction their magnet-bearing surfaces face, one group having their magnet-bearing surfaces face up, for example, and the other group having their magnet-bearing surfaces face down. In accordance with another aspect of the present invention, the magnet cards are processed for information recordation without disturbing the card orientations, by recording information first on all of the cards facing in one direction or orientation and then recording information on all cards facing in the opposite direction or orientation. Therefore, a plurality of cards properly arranged for subsequent insertion into a memory may be processed completely without any necessity for manual manipulation of the cards after recordation.

In accordance with a further aspect of the present invention, a simple check circuit is utilized to monitor the recording of information in each row of storage elements on a card. If all of the rows of storage elements on a card are not processed properly in a single pass of the transducer heads, the check circuit automatically initiates a second pass of the transducers to process the card. If after a predetermined number of attempts at automatically processing a card the check circuit still indicates failure, an alarm is provided and information recording operation is stopped.

Accordingly, it is a feature of this invention that an arrangement for recording information in discrete portions of each of a plurality of information storage cards comprise apparatus for individually positioning successive ones of the cards adjacent the path of movable transducer apparatus, circuitry for sensing the discrete portions of a positioned card to energize the transducer apparatus, and circuitry operative upon completion of information recording on a card for returning the transducer apparatus to its starting position and for inhibiting the sensing circuitry during the return of the transducer apparatus.

Another feature of this invention relates to an arrangement for recording information on a plurality of information storage cards comprising a card processing surface, apparatus operable for releasably engaging individual ones of the cards, and circuitry for operating the card engaging apparatus to position successive ones of the cards on the surface and to remove the cards therefrom to magazine apparatus upon completion of information recording thereon.

A further feature of this invention relates to an arrangement for recording information on a plurality of information storage cards comprising apparatus for engaging and positioning successive ones of the cards adjacent the path of movable transducer apparatus for recording information on the cards, apparatus operable for braking movement of the engaging and positioning apparatus and of the transducer apparatus, and energy storage circuitry responsive to removal of power from the information recording arrangement for automatically operating the braking apparatus.

A still further feature of this invention relates to an arrangement for recording information on cards including circuitry for selectively recycling information recording operation with respect to individual ones of the cards and circuitry operated upon a predetermined number of recycle operations with respect to the same card for stopping information recording operation and for providing an alarm indication.

These and other objects and features of this invention may be better understood upon consideration of the following detailed description and the accompanying drawing in which.

Figure 11:
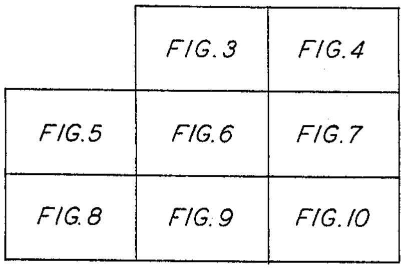

FIGS. 3 through 10 comprise a schematic diagram of a specific illustrative embodiment of an information recording system in accordance with the present invention;

FIG. 11 shows the arrangement of FIGS. 3 through 10; and

Figure 12:
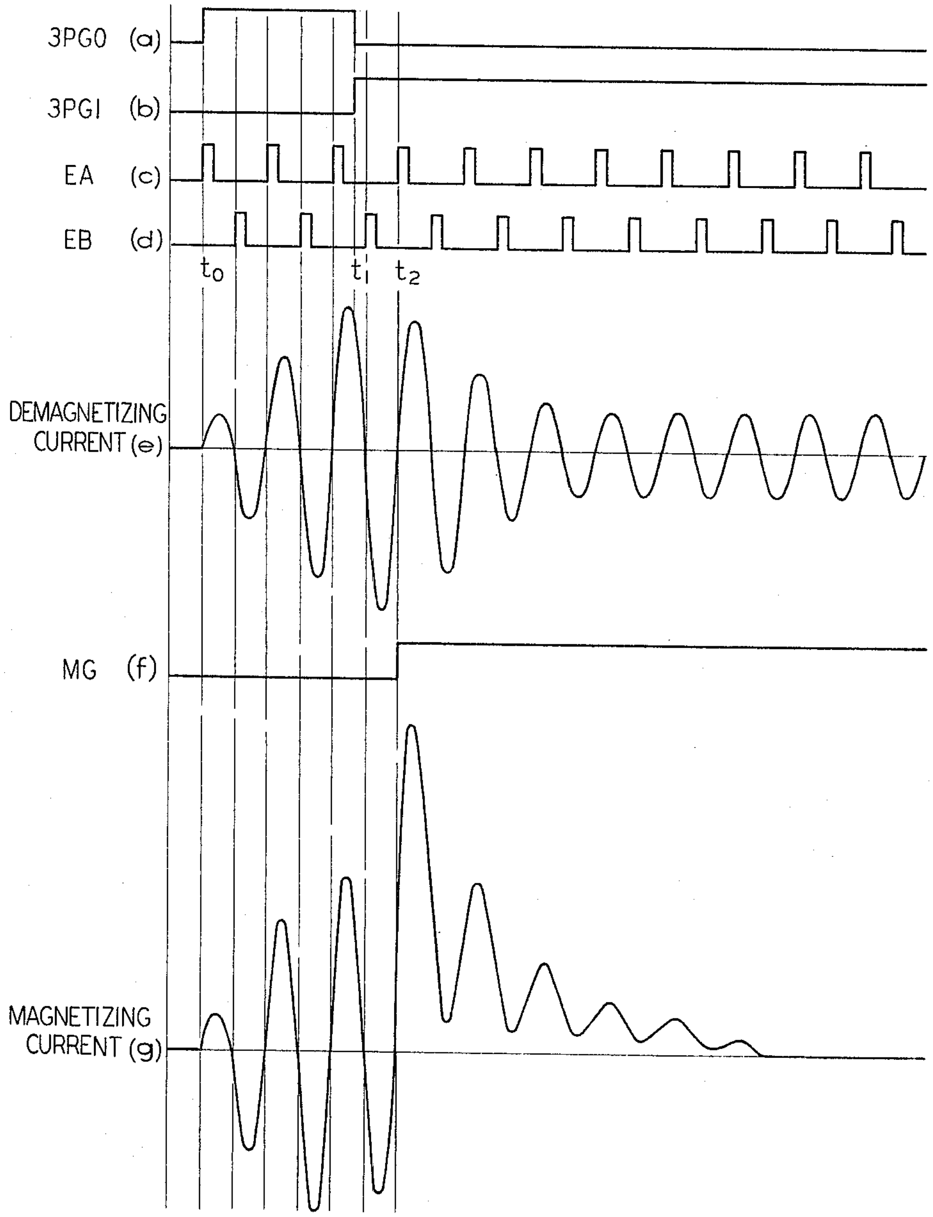

FIG. 12 is a time chart indicating the information recording operation of the illustrative embodiment of FIGS. 3 through 10.

For the purpose of facilitating description of an illustrative embodiment of the present invention, it has been assumed that information is to be recorded on pluralities of permanent magnet storage cards for use in card-changeable memories of the type described, for example, in the above-mentioned article and in the S. M. Shackell patent application. Therein the removable magnet cards each have a plurality of binary bit magnets bonded or deposited thereon and arranged in coordinate rows and columns, each row of bit magnets corresponding to a word of information stored in the memory. Illustratively, each magnet card may comprise 64 word rows of 44 bit magnets each. Located between each row of bit magnets on a card, and also preceding the first row and following the last row, is a positioning magnet. The positioning magnets, numbering 65 in the illustrative example herein, serve the purpose of positioning, or locating, the magnet cards with respect to the recording circuitry during information recording operation, as will be described in detail herein below.

The individual storage cards are situated in respective planes of the memory so that each bit magnet is in the proximity of a respective magnetic memory crosspoint. If a magnet is in a magnetized condition the respective memory crosspoint is thus biased by the static magnetic field of the magnet. When an interrogation signal is applied to a memory crosspoint in the absence of a static magnetic field, an output signal is generated representative of a bit of one binary character such as binary "1." The presence of a static magnetic field due to a bit magnet in a magnetized condition, however, inhibits generation of an output signal from a crosspoint, which is representative of a bit of the other binary character such as binary "0." Accordingly, information is stored in the memory by selectively magnetizing or demagnetizing the bit magnets on the storage cards in a pattern in accordance with the binary bits of information to be stored. Thus, use of the single term recording herein will subsume both magnetization and demagnetization of bit magnets.

Figure 1:
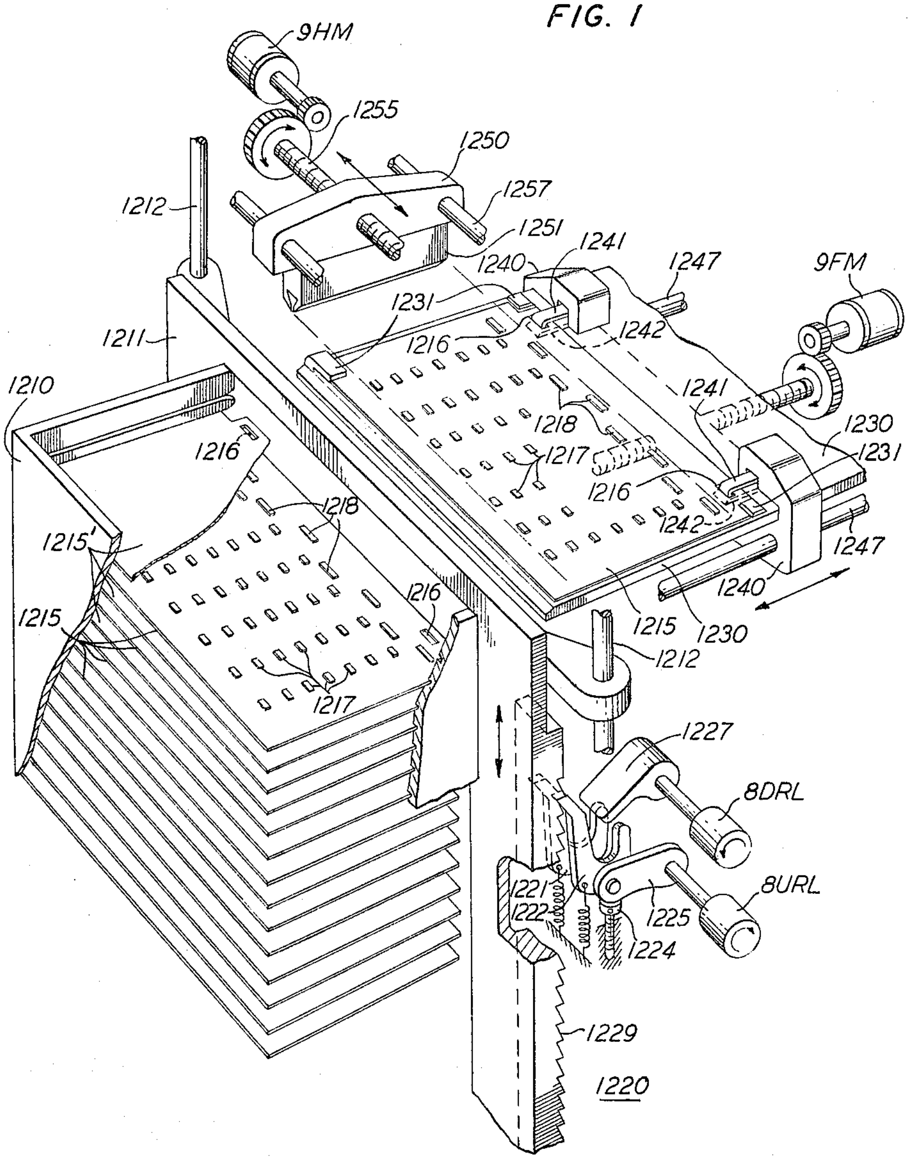
FIG. 1 depicts illustrative card handling apparatus for handling memory storage cards for recording information thereon in accordance with the principles of our invention.
Figure 2A:
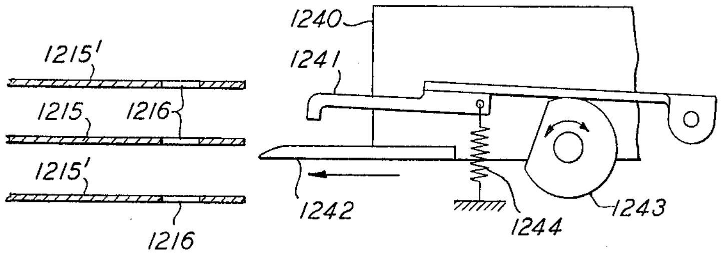
FIGS. 2A and 2B show illustrative finger apparatus employed in the embodiment of FIG. 1 for handling individual storage cards.
Figure 2B:
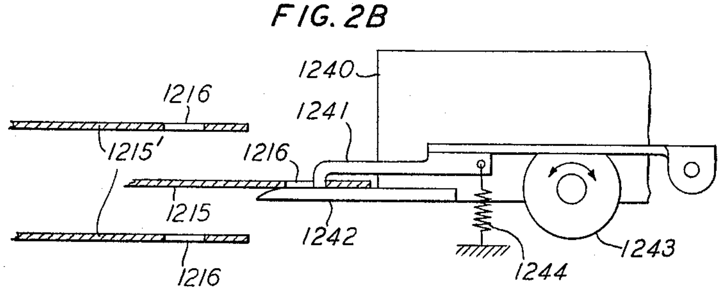

Referring now to FIGS. 1, 2A and 2B, and to FIGS. 3 through 10, arranged as shown in FIG. 11, an information recording system is shown for recording binary information on a plurality of movable storage cards by selectively magnetizing or demagnetizing each of a plurality of discrete magnets located thereon. The information to be recorded on the individual magnet storage cards is provided on input leads 100 through 143 by information control circuit 40 comprising source of information signals 41, which may include any known source for providing parallel information signals for recordation. Information control circuit 40 also includes suitable known circuitry for providing successive words of information on leads 100 through 143 only upon request, the present information recording arrangement thus controlling the rate at which words of information are provided for recordation. The cards are processed individually on a one-at-a-time basis by common recording equipment including a single row of transducer heads 1251. The mode of operation for processing each card is substantially the same and, therefore, a complete comprehension of the recording operation can be obtained from a description of the processing cycle for a single card. However, before proceeding with a detailed description of the information recording operation, operation of the card handling apparatus depicted in FIGS. 1, 2A and 2B will be considered.

*Card handling apparatus*

The card handling apparatus shown in FIG. 1 basically comprises a mounting plate 1211, card indexing apparatus 1220, card positioning apparatus 1230 and 1231, card engaging apparatus 1240, and movable transducer head assembly 1250. For information recording purposes, a card magazine 1210 containing a plurality of magnet cards 1215 and 1215′ disposed in grooves or slots therein is positioned on mounting plate 1211, as shown in FIG. 1. Suitable card magazine apparatus in which the magnet cards may be disposed for information recording purposes is described in detail in J. J. Madden application Serial No. 266,993, filed March 21, 1963. In the card magazine orientation shown in FIG. 1, cards 1215 have their magnet-bearing surfaces face up for recording information thereon, and cards 1215′ have their magnet-bearing surfaces face down. This is a typical arrangement of the magnet cards for subsequent insertion into a memory and, as mentioned above, the present information recording system advantageously permits processing of the cards for information recordation without disturbing the card orientations. After cards 1215 have been processed in the orientation shown in FIG. 1, magazine 1210 is removed from plate 1211 and repositioned thereon such that cards 1215′ have their magnet-bearing surfaces face up for information recording. Thus, two card processing orientations are defined which will be referred to herein as orientation "A" and orientation "B," the former for processing cards 1215 and the latter for processing cards 1215′.

Mounting plate 1211 is disposed on guide rods 1212 for longitudinal movement in a vertical direction, as indicated in FIG. 1. Frictional resistance may be minimized through the use of linear ball bearings or the like to couple mounting plate 1211 to rods 1212. Stepping movement is provided to mounting plate 1211, and thus to magazine 1210, by card indexing apparatus 1220 comprising rack 1229, hold pawl 1221 and advance pawl 1222. Each step of vertical movement of magazine 1210 corresponds to the distance between similarly oriented magnet cards therein; that is, to the distance between successive cards having their magnet-bearing surfaces face up. When up solenoid 8URL is energized, clockwise rotation through a predetermined angle is imparted to arm 1225 which urges advance pawl 1222 upward from its rest position against stop 1224. Advance pawl 1222 is in engagement with rack 1229 and thus moves mounting plate 1211, and magazine 1210 clamped thereto, upward one step. When solenoid 8URL is de-energized, advance pawl 1222 is returned to its rest position against stop 1224 and engages the next lower step on rack 1229. During the return of advance pawl 1222 mounting plate 1211 is prevented from downward movement by hold pawl 1221.

A trip arm 1227 is disposed in conjunction with down solenoid 8DRL to permit mounting plate 1211 to be returned to its lowermost position when desired, such as when all of cards 1215 have peen processed. Energization of solenoid 8DRL imparts sufficient rotational movement to trip arm 1227 to trip both hold pawl 1221 and advance pawl 1222 from engagement with rack 1229, thereby permitting plate 1211 to descend down guide rods 1212. The descent of plate 1211 may be cushioned by air cylinders or the like (not shown). In the lowermost position of mounting plate 1211, which will be referred to herein as its home position, the first magnet card 1215 or 1215′ in magazine 1210 to be processed is one step below the surface of card processing table 1230. Indexing mounting plate 1211 upward one step in the manner described above places the first magnet card on a horizontal level with table 1230. This is the position in which mounting plate 1211 is shown in FIG. 1.

The magnet cards 1215 are withdrawn from card magazine 1210 on to table 1230 one at a time for processing and are then reinserted in magazine 1210 through the operation of card engaging, or finger assembly, apparatus 1240. Finger assembly apparatus 1240 is mounted on guide rods 1247 for horizontal movement in the direction indicated, and is driven by motor 9FM through suitable coupling to lead screw 1245 which is in threaded engagement with finger assembly 1240. Finger assembly 1240 is normally situated toward the rear of table 1230 clear of mounting plate 1211, which will be referred to herein as the home position of finger assembly 1240. When motor 9FM is energized in one rotational direction, therefore, longitudinal movement is imparted to finger assembly 1240 via lead screw 1245, causing assembly 1240 to move forward adjacent table 1230 on guide rods 1247. When motor 9FM is energized in the opposite rotational direction, longitudinal movement is imparted to finger assembly 1240 in the opposite direction toward the rear of table 1230. The position of finger assembly 1240 shown in FIG. 1, at the rear of table 1230, will be referred to herein as its back position.

Finger assembly 1240 comprises two pairs of grip fingers spaced apart to permit releasable engagement with two slots 1216 in each magnet card 1215 and 1215′. A detail of one pair of grip fingers of finger assembly 1240 is shown in FIGS. 2A and 2B, comprising a stationary finger 1242 and a movable finger 1241. The position of movable finger 1241 is controlled, for example, by rotatable cam 1243 in conjunction with spring 1244. Cam 1243 is rotated by a finger solenoid 8FRL (not shown in FIGS. 2A and 2B). Fingers 1241 and 1242 are opened by energizing solenoid 8FRL, rotating cam 1243 to the position shown in FIG. 2A, thereby maintaining finger 1241 a distance above finger 1242 greater than the thickness of a magnet card. When it is desired to withdraw a card from magazine 1210, finger assembly 1240 is moved forward toward mounting plate 1211, in the manner described above, until fingers 1241 are adjacent the slots 1216 in a magnet card to be withdrawn from magazine 1210. Cam 1243 then rotated sufficiently to permit spring 1244 to urge movable fingers 1241 downward into engagement with slots 1216, as shown in FIG. 2B. Thereafter motor 9FM is reversed, moving finger assembly 1240 away from mounting plate 1211 to withdraw the seized card from magazine 1210 into table 1230. Positioning stops 1231 are provided on table 1230 to assure accurate positioning of each magnet card for recording purposes. Cam 1243 remains in the position shown in FIG. 2B, retaining the grip of fingers 1241 and 1242 on the seized magnet card, until it is desired to release the card. Release of a seized card, such as when processing thereof has been completed and the card has been returned to magazine 1210, is effected by rotating cam 1243 to the position shown in FIG. 2A to urge fingers 1241 upward from engagements with slots 1216.

Transducer head assembly 1250, comprising a plurality of transducer heads 1251, is mounted on guide rods 1257 for horizontal movement adjacent table 1230, as indicated in FIG. 1. Head assembly 1250 is driven in much the same manner as finger assembly 1240, motor 9HM being suitably coupled to lead screw 1255 which is in threaded engagement with assembly 1250. Head assembly 1250 is normally in the position shown in FIG. 1, which is referred to herein as its home position. When a magnet card has been withdrawn from magazine 1210 and positioned on table 1230 by finger assembly 1240, motor 9HM is energized to drive head assembly 1250 adjacent the magnet card from left to right in FIG. 1. Transducer heads 1251 are energized at this time, in the manner described in detail hereinbelow, to effect recording of information on the magnet card. When the entire magnet card has been processed, motor 9HM is reversed to return head assembly 1250 to its home position.

To recapitulate, the operation of the illustrative card handling apparatus shown in FIG. 1 for processing a plurality of magnet cards individually is as follows: A magazine of cards 1215 and 1215′ is clamped in one orientation, such as orientation "A," to mounting plate 1211 which is initially in its lowermost, or home, position. Finger assembly 1240 and head assembly 1250 are each initially in their home positions, respectively toward the rear and at the left in FIG. 1. Solenoid 8URL is energized and released, indexing mounting plate 1211 upward one step to place the first magnet card 1215 in magazine 1210 on a horizontal level with table 1230. Cam 1243 is rotated to open fingers 1241 and motor 9FM is energized to drive finger assembly 1240 forward until fingers 1241 are situated adjacent slots 1216 of the first magnet card 1215. Cam 1243 is returned to a position permitting fingers 1241 to engage slots 1216 and thus seize card 1215. Motor 9FM is thereafter reversed to withdraw the seized magnet card 1215 on to table 1230, card 1215 being urged into the proper position by stops 1231. Motor 9HM is then energized to drive transducer head assembly 1250 from left to right in FIG. 1, heads, 1251 effecting information recordation on card 1215 positioned on table 1230. After recording is completed, motor 9HM is reversed to return head assembly 1250 to its home position. Motor 9FM is then energized again, driving finger assembly 1240 forward to reinsert the processed card 1215 into its original slot in magazine 1210. When card 1215 has been reinserted in magazine 1210, cam 1243 is rotated to open fingers 1241 and 1242, releasing card 1215; and motor 9FM is reversed to return finger assembly 1240 to its home position, clear of mounting plate 1211. Finger assembly 1240 is not driven to its back position between processing of individual cards, but rather only to its home position to permit stepping of mounting plate 1211. Solenoid 8URL is then energized to index mounting plate 1211 upward one step, placing the second magnet card 1215 on a horizontal level with table 1230, and the operation described above is repeated. When all of cards 1215 in magazine 1210 have been processed in this manner, solenoid 8DRL is energized to trip pawls 1221 and 1222, permitting mounting plate 1211 to return to its home position. Magazine 1210 may then be removed from plate 1211 and reclamped thereto in orientation "B" for processing magnet cards 1215′ in the same manner.

The circuit connections and switches for effecting the operation of the card handling apparatus have been omitted from FIG. 1 for the purposes of clarity and to facilitate description thereof. For example, the card handling apparatus advantageously includes various switches to monitor the orientation of magazine 1210 and the respective locations of mounting plate 1211, finger assembly 1240 and head assembly 1250, none of which are shown in FIG. 1. More particularly, a pair of switches 9OR1–SW and 9OR2–SW respectively operate to indicate whether magazine 1210 is in orientation "A" or orientation "B" on mounting plate 1211; a pair of switches 9DN–SW and 9END–SW respectively operate when mounting plate 1211 is in its lowermost home position and when it is indexed into its uppermost position; a switch 8UP–SW operates each time solenoid 8URL is energized to index mounting plate 1211 upward; a pair of switches 9LF–SW and 9RT–SW respectively operate when head assembly 1250 is in its home position at the left in FIG. 1 and when it is at the right in FIG. 1 upon completion of a pass of a card on table 1230; a pair of switches 9FD–SW and 9BK–SW respectively operate when finger assembly 1240 is positioned for engaging a card in magazine 1210 and when it is at the rear of table 1230; and a switch 5CL–SW is operated when finger assembly 1240 is positioned clear of mounting plate 1211 and is between the positions operating switches 9FD–SW and 9BK–SW. The contacts of each of these switches and the various circuit connections necessary for the operation of the card handling apparatus of FIG. 1 are shown in FIGS. 3 through 10, and a complete understanding of their function and operation may be had from the following detailed description of information recording operation.

*Information recording operation*

In FIGS. 3 through 10, to which reference is now made, much of the circuitry which is well known in the art such as AND, OR, flip-flop and binary counter circuits is shown in block diagram form to permit greater clarity and to facilitate description of applicants' invention. Further for these purposes, the relay circuitry is shown in well-known detached contact form, a relay coil being represented by a block, a make contact being represented by a pair of lines intersecting on a conductor, and a break contact being represented by a single line perpendicularly intersecting a conductor. The first digit of each relay coil designation indicates the figure in which the particular relay coil is located; for example, relay 5TO is located in FIG. 5. Each relay contact is designated by the designation of its controlling relay and, additionally, by a number individual to the contact. The various relay contacts are shown in their unoperated states in FIGS. 3 through 10, the corresponding controlling relay coils therefor being de-energized. Other elements in FIGS. 3 through 10 are designated in a manner similar to the relay coils, the number preceding the functional designation of the elements indicating the figure in which the element is located. Thus, for example, word request flip-flop 3WR is located in FIG. 3, down solenoid 8DRL is located in FIG. 8 and head motor 9HM is located in FIG. 9. The functional designations of the various contacts of the above-mentioned and other switches in FIGS. 3 through 10 are preceded by a digit arbitrarily indicating the figure in which the first contact of the particular switch is located.

Figure 8:
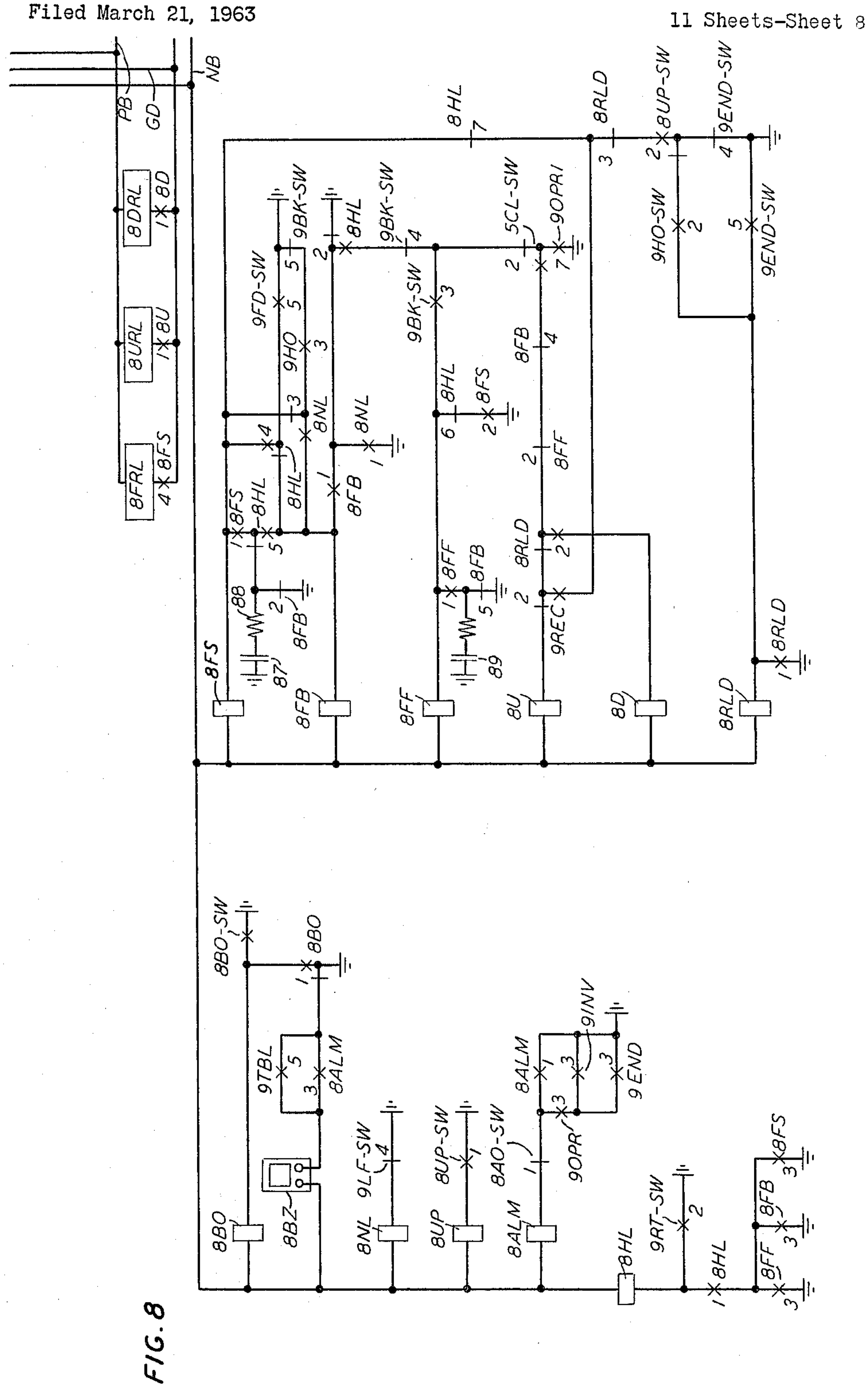
Figure 9:
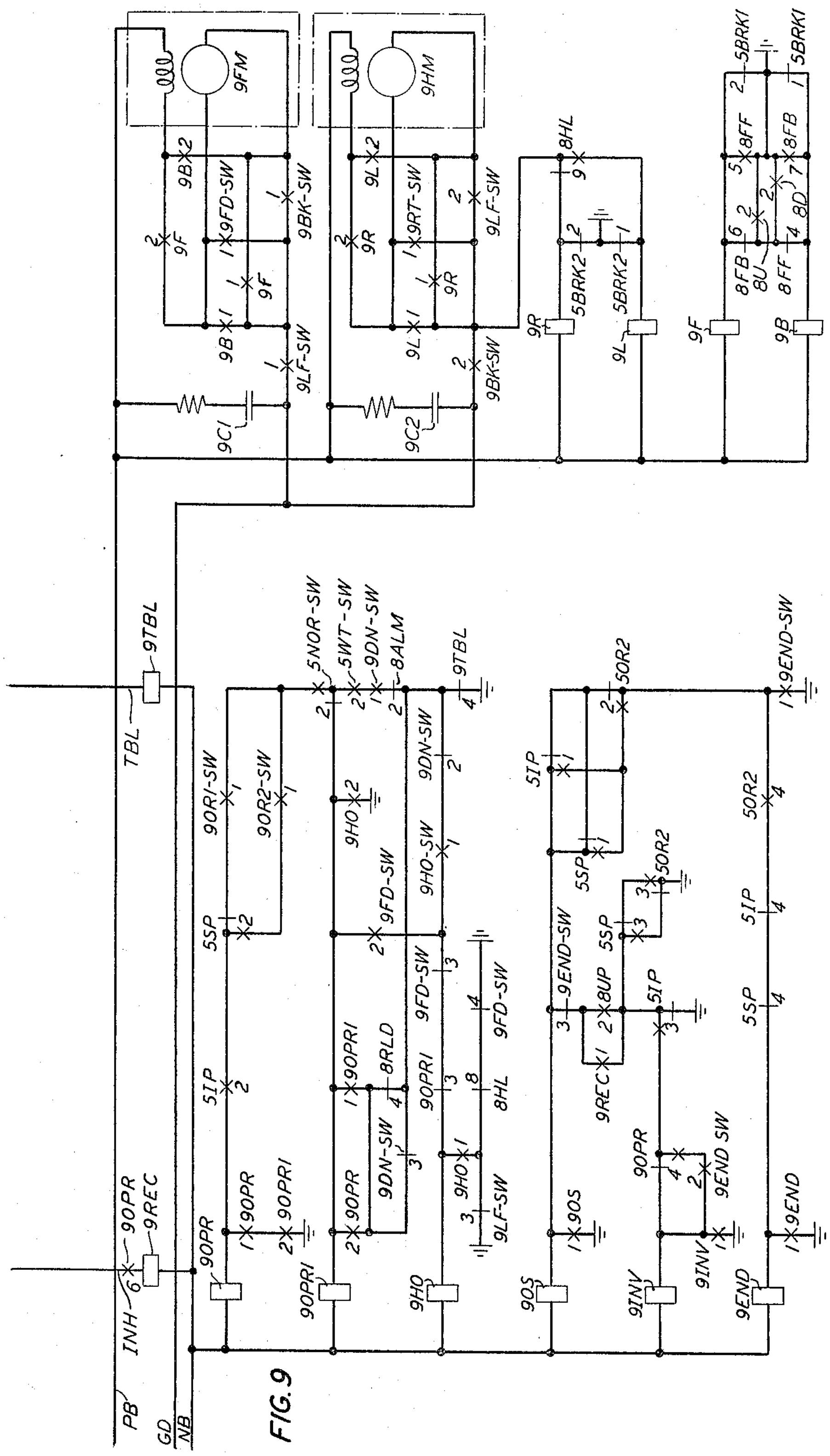
Figure 10:
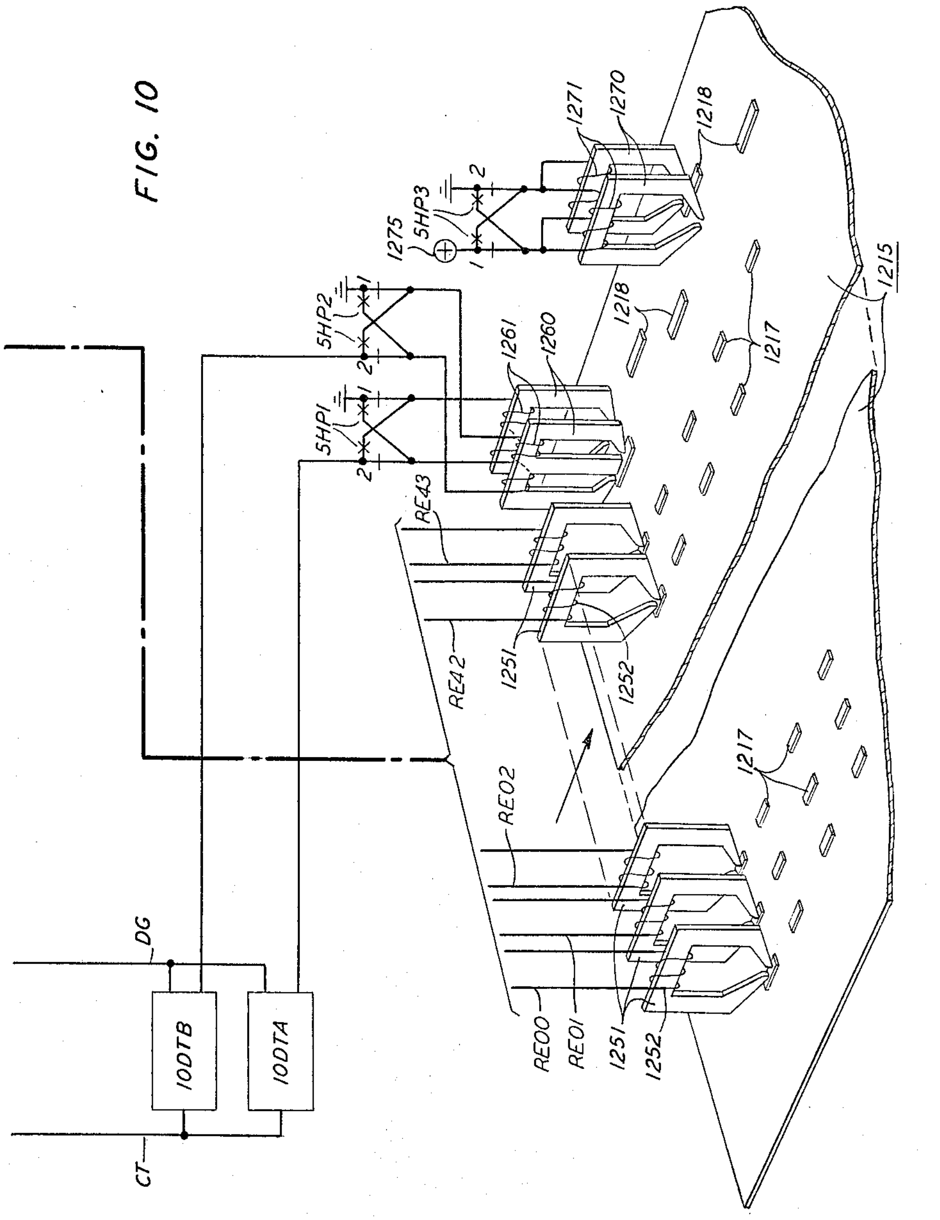

The illustrative information recording system shown in FIGS. 3 through 10 basically comprises information input circuitry (FIG. 4), power control and steering circuitry (FIG. 5), logic sequence control circuitry (FIGS. 3 and 6), recording control circuitry (FIG. 7), card handling apparatus control circuitry (FIGS. 8 and 9), and transducers and position detectors (FIG. 10). As mentioned above, each word of information to be recorded in a row of magnets on a card positioned on table 1230 is provided on leads I00 through I43 by information control circuit 40, shown in FIG. 4. Each successive word of information is provided on leads I00 through I43 only upon request therefor, as indicated by a signal on lead WR from word request flip-flop 3WR, and is registered in input registers 4R00 through 4R43.

Information control circuit 40 also provides a signal on lead IP operating relay 5IP to indicate that the words of information appearing on leads I00 through I43 are for recordation on cards 1215; or if the information is for recordation on cards 1215′, control circuit 40 provides a signal on both of leads IP and SP operating relays 5IP and 5SP, respectively. If the information provided by control circuit 40 fails initially to correspond to the orientation of magazine 1210, as indicated by relays 5IP and 5SP and by switches 9OR1–SW and 9OR2–SW, respectively, relay 9OPR is rendered inoperable and prevents operation of the card handling apparatus.

Figure 5:
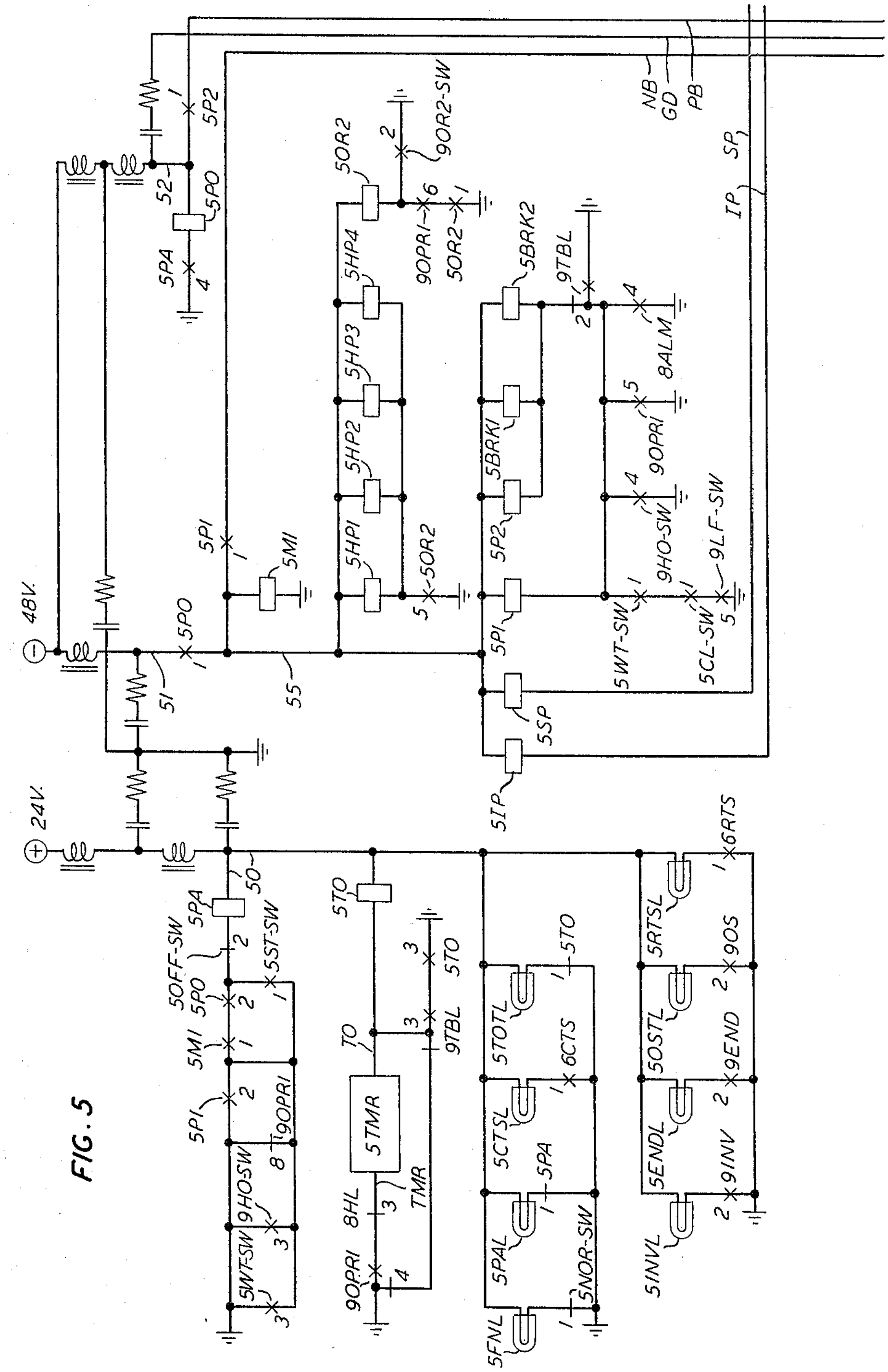

In addition to relays 5IP and 5SP, the power control and steering circuitry, generally shown in FIG. 5, comprises power control relays 5PA and 5PO, power steering relays 5P1 and 5P2, motor brake relays 5BRK1 and 5BRK2, a plurality of indicator lamps, a pair of nonlocking switches 5ST–SW and 5WT–SW, and a pair of locking switches 5NOR–SW and 5OFF–SW. Operation of switches 5NOR–SW and 5ST–SW places the system in a normal power available state, energizing relays 5PA, 5PO and 5M1 if power is available on each of leads 50, 51 and 52. Absence of power on either of leads 51 or 52 prevents relay 5PA from locking up when switch 5ST–SW is released, and thus precludes further system operation. Relay 5PO extends power to lead 55 and subsequent operation of switch 5WT–SW initiates information recording operation, energizing relays 5BRK1 and 5BRK2 to remove any braking connection from motors 9HM and 9FM, and energizing relays 5P1 and 5P2 to extend power on leads PB and NB to the card handling apparatus control circuitry in FIGS. 8 and 9. Assuming proper corresponding between the information provided by control circuit 40 and the orientation of magazine 1210, the power on lead NB energizes relays 9OPR and 9OPR1 to establish various operating paths for the system, which will be traced in detail below. If magazine 1210 is in orientation "B," operating relay 5OR2, transducer head polarity relays 5HP1 through 5HP4 are energized to reverse the polarity of the connections to the transducers in FIG. 10. A timing circuit including timer 5TMR and timeout relay 5TO provides timing checks of various operations of the card handling apparatus, as will be described hereinbelow.

The card handling apparatus control circuitry, generally shown in FIGS. 8 and 9, comprises previously-mentioned solenoids 8URL and 9DRL for operating card indexing apparatus 1220, finger solenoid 8FRL for operating card engaging fingers 1241, and motors 9FM and 9HM for driving finger assembly 1240 and head assembly 1250, respectively. The solenoids and motors are each connected to lead PB. Solenoids 8FRL and 8URL are respectively controlled by relays 8FS and 8U, and solenoid 8DRL is controlled by relays 8RLD and 8D. Relay 8RLD is energized when mounting plate 1211 is indexed upward to its uppermost position operating switch 9END–SW; and relay 8UP is energized each time mounting plate 1211 is indexed upward one step, operating switch 8UP–SW. Energization and direction of rotation of finger motor 9FM is controlled by relays 8FF, 8FB, 9F and 9B and by switches 9FD–SW and 9BK–SW, and is interlocked through switch 9LF–SW to preclude operation of motor 9FM unless head assembly 1250 is in its home position. Relays 9R, 9L and 8HL and switches 9RT–SW and 9LF–SW control the energization and direction of rotation of head motor 9HM, and motor 9HM is interlocked through switch 9BK–SW to preclude operation thereof unless finger assembly 1240 is in its back position. Relays 8HL and 8NL monitor the position of head assembly 1250 as indicated by switches 9RT–SW and 9LF–SW.

Relay 9INV is energized by operation of switch 9END–SW upon completion of processing of the cards in orientation "A," lighting lamp 5INVL and operating buzzer 8BZ, via alarm relay 8ALM, to indicate that magazine 1210 should be inverted to orientation "B" for further processing. Similarly, when all of the cards in orientation "B" have been processed, relay 9END is energized to light lamp 9ENDL and to operate buzzer 8BZ. If during the information recording operation the proper correspondence is lost between the information being provided by information control circuit 40 and the orientation of magazine 1210, out-of-step relay 9OS is energized to light lamp 5OSTL and to energize trouble relay 9TBL, thereby operating buzzer 8BZ and stopping system operation. Nonlocking home switch 9HO–SW and home relay 9HO are provided to permit head assembly 1250, finger assembly 1240 and mounting plate 1211 to be returned to their respective home positions when desired. Recycle control relay 9REC is energized under various conditions by the logic sequence control circuitry, shown in FIGS. 3 and 6, to selectively provide recycle of the information recording operation with respect to a particular card being processed. Trouble relay 9TBL is energized under various trouble conditions, such as when the system falls out of step with the information being provided, to operate buzzer 8BZ and to stop system operation.

In FIG. 10, transducer head assembly 1250 is shown comprising a plurality of recording transducers 1251 and, additionally, a pair of sense transducers 1260 and a pair of recording transducers 1270. As mentioned above, the polarity of the connections to these transducers is controlled by the operation of relays 5HP1 through 5HP4. During information recording operation, as assembly 1250 is driven adjacent a card positioned on table 1230, the position of transducers 1251 relative to each successive row of magnets on the card is sensed by sense transducers 1260 to provide a position indication through detector circuits 10DTA and 10DBT on lead CT to the logic sequence control circuitry. Upon completing a pass of a card on table 1230, head assembly 1250 is returned to its home position; and during the return of assembly 1250, an inhibit signal from the logic sequence control circuitry on lead DG prevents the generation of position indications on lead CT.

Figure 3:
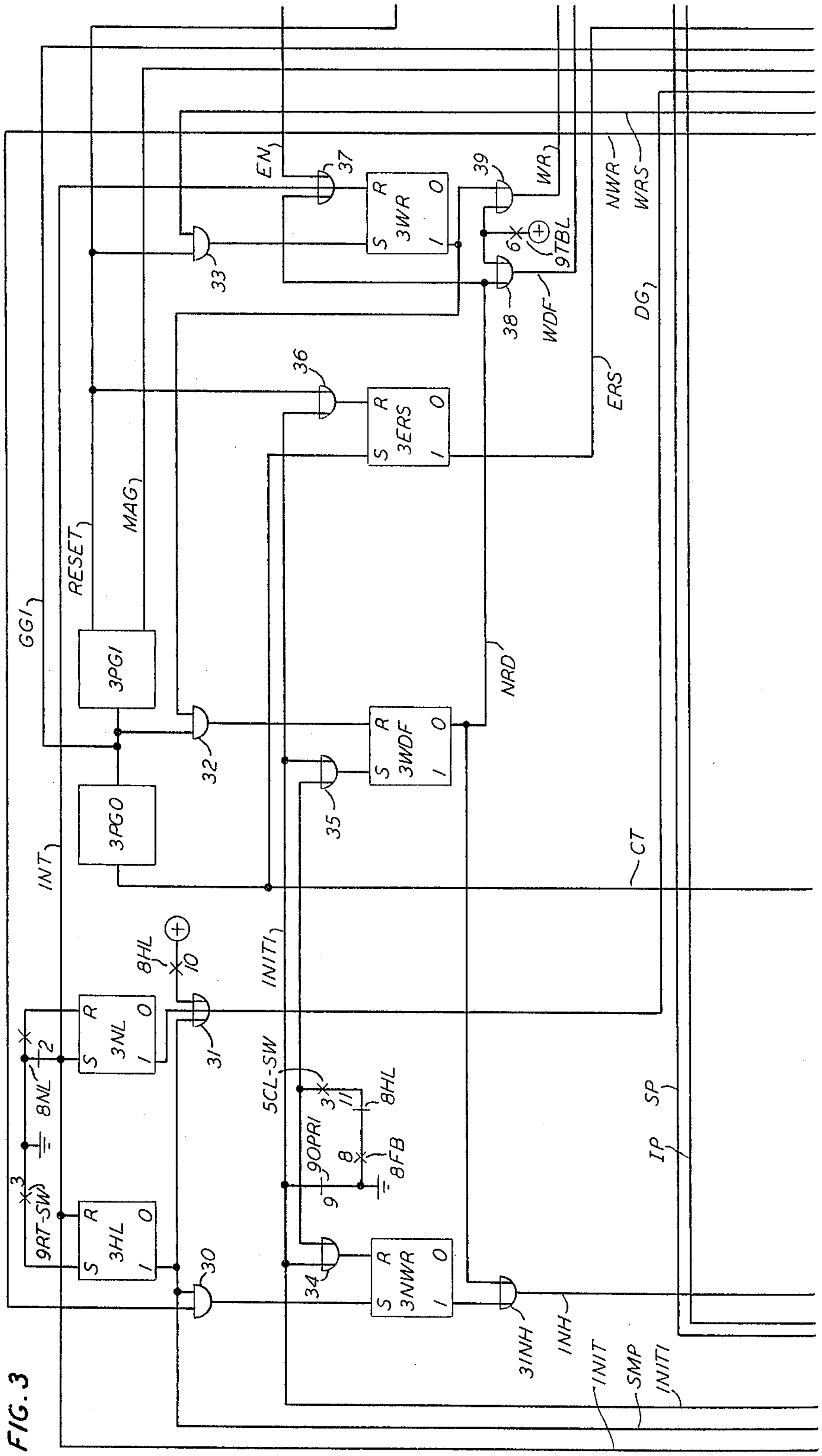
Figure 4:
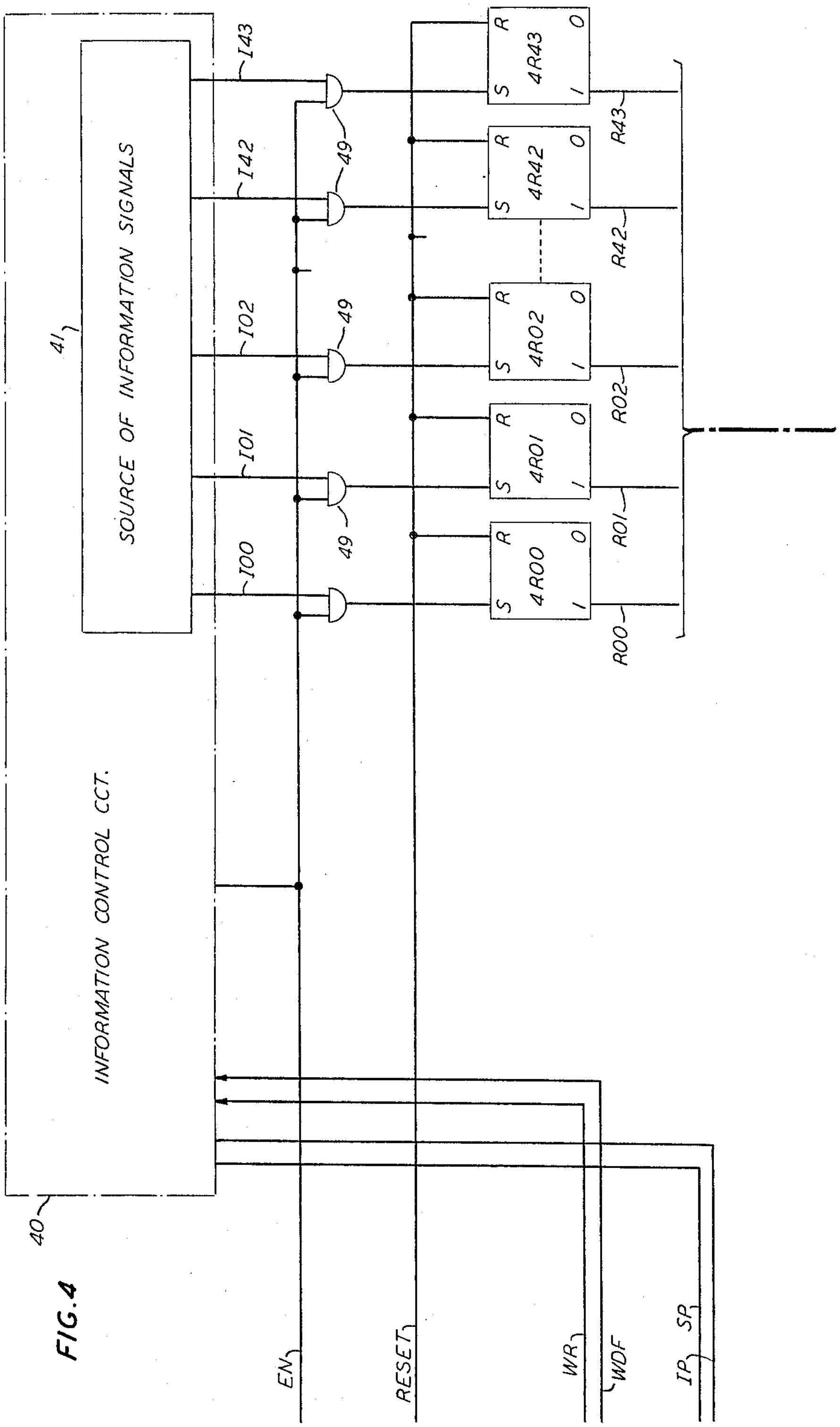
Figure 6:
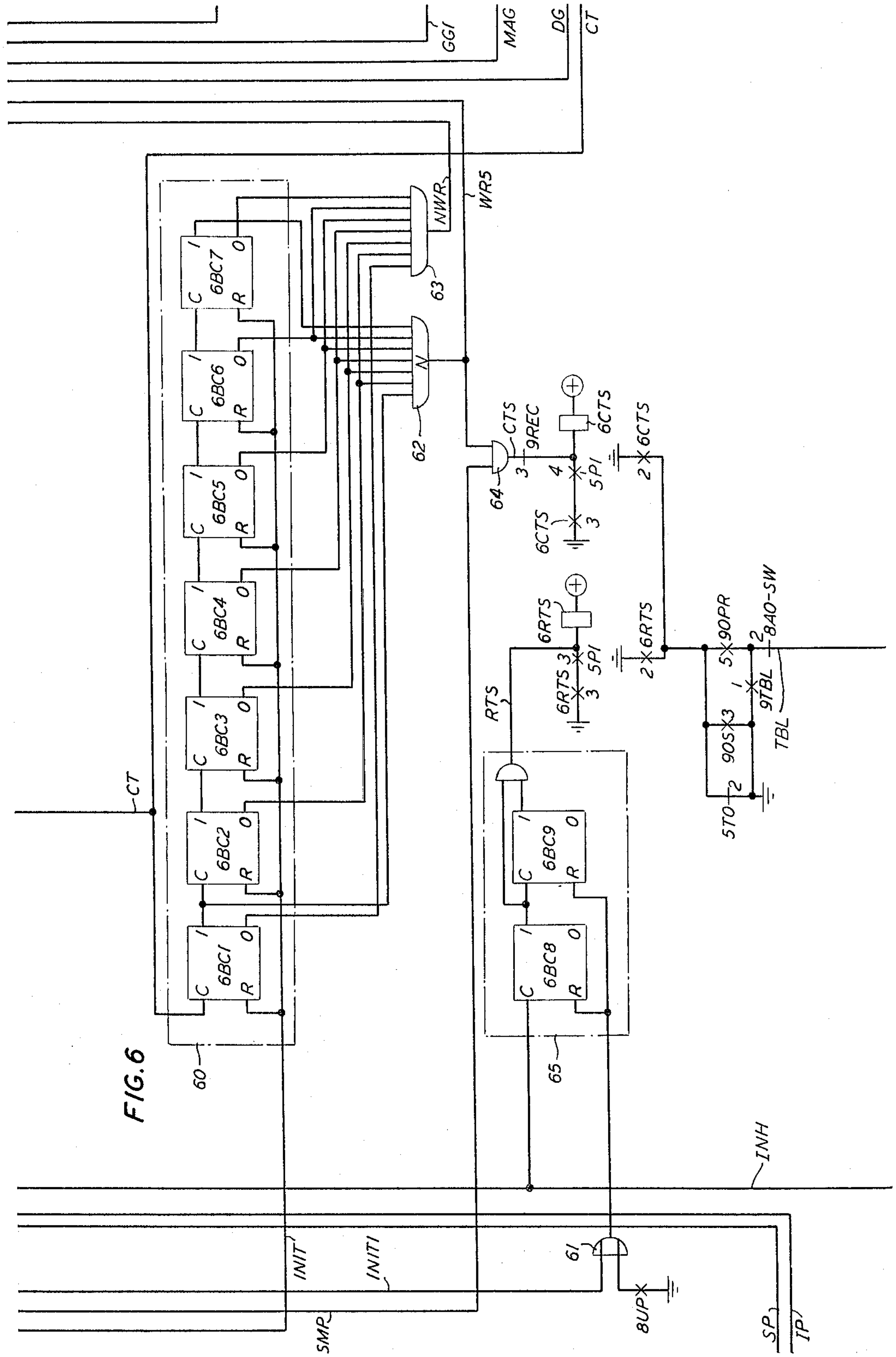

The logic sequence control circuitry, generally shown in FIGS. 3 and 6, comprises pulse generation circuitry including delay pulse generators 3PG0 and 3PG1, information word counter 60, recycle counter 65, flip-flops 3WR and 3WDF for communicating via leads WR and WDF with information control circuit 40, and various other flip-flops and interconnecting circuits. Each position indicating appearing on lead CT from detector circuits 10DTA and 10DTB advances word counter 60 and energizes the pulse generation circuitry which, after a predetermined time interval, pulses word request flip-flop 3WR to apply a request signal on lead WR to information control circuit 40. Responsive thereto, as mentioned above, information control circuit 40 registers a word of information in registers 4R00 through 4R43. Each position indication appearing on lead CT is also applied to flip-flop 3ERS, which energizes oscillator 7OSC to initiate the recording of a word of information in a row of magnets adjacent transducers 1251.

If information control circuit 40 fails to deliver a word of information when requested, flip-flop 3WDF is subsequently switched to apply a word delivery failure signal on lead WDF to control circuit 40. The word delivery failure signal is also applied by flip-flop 3WDF to lead INH to initiate recycle operation with respect to the card being processed, thereby energizing recycle control relay 9REC and advancing recycle counter 65. Recycle operation is similarly initiated by a signal on lead INH from flip-flop 3NWR when no position indications appear on lead CT during a pass of transducer assembly 1250 adjacent a card positioned on table 1230. After a predetermined number of recycle attempts at processing the same card, recycle counter 65 energizes recycle trouble stop relay 6RTS to operate trouble relay 9TBL, stopping system operation and lighting lamp 5RTSL. System operation is similarly stopped, and lamp 5CTSL is lighted, by energization of count trouble stop relay 6CTS if transducer assembly 1250 completes a pass adjacent a card, thereby setting flip-flop 3HL, and an insufficient number of position indications have appeared on lead CT as indicated by counter 60.

Figure 7:
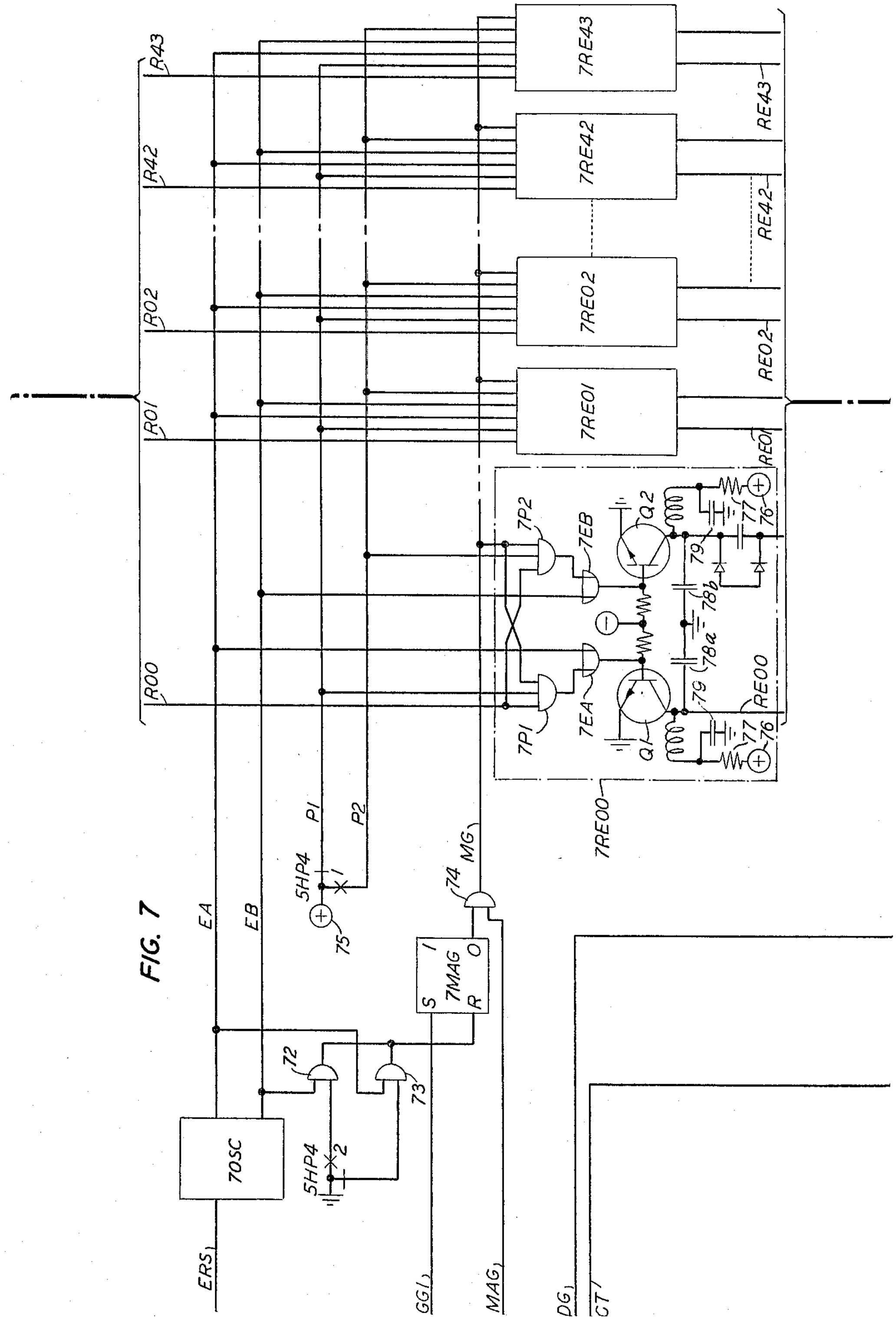

The recording control circuitry, generally shown in FIG. 7, comprises oscillator 70SC, magnetization flip-flop 7MAG, and a plurality of recording circuits 7RE00 through 7RE43. The successive words of information registered in registers 4R00 through 4R43 are applied to recording circuits 7RE00 through 7RE43 which, under the control of oscillator 70SC and flip-flop 7MAG, selectively apply magnetization and demagnetization signals to transducers 1250 in accordance with the information to be recorded. Oscillator 70SC is energized by signal on lead ERS from flip-flop 3ERS, it will be recalled, and commences recording of a word of information by applying demagnetizing current via recording circuits 7RE00 through 7RE43 to each of transducers 1250. Subsequently, at a point in time accurately controlled by flip-flop 7MAG, recording circuits 7RE00 through 5RE43 apply magnetizing current to selected ones of transducers 1250, application of demagnetizing current continuing to the nonselected ones of transducers 1250.

A detailed description of information recording operation of the illustrative embodiment of the present invention shown in FIGS. 3 through 10, arranged as shown in FIG. 11, will now be considered. Assume that a plurality of cards 1215 and 1215′ in magazine 1210 have been positioned on mounting plate 1211 for information recording purposes. Magazine 1210 is thus clamped to plate 1211 in orientation "A," for example, the magnet-bearing surfaces of cards 1215 being face up. Switch 90R1–SW (not shown in FIG. 1) is operated thereby to indicate that magazine 1210 is in orientation "A." A ground signal on lead IP from information control circuit 40 indicates that the information to be provided thereby for recording corresponds to the magnet cards in orientation "A"; that is, to magnet cards 1215. Assume further that mounting plate 1211 is in its home position operating down switch 9DN–SW (not shown in FIG. 1), that finger assembly 1240 is in its home position, clear of magazine 1210, to permit indexing of mounting plate 1211 as indicated by the operation of clear switch 5CL–SW (not shown in FIG. 1), and that head assembly 1250 is in its home position operating left switch 9LF–SW (not shown FIG. 1). Ground on lead INIT via the break portion of transfer contact 2 of relay 8NL initially resets flip-flop 3WR through OR-gate 37, sets flip-flop 3NL to apply an inhibit signal through OR-gate 31 on lead DG, resets flip-flop 3HL, and resets binary counter 60. Ground on lead INIT1 via contact 9 of relay 90PR1 initially resets flip-flop 3ERS through OR-gate 36, sets flip-flop 3WDF through OR-gate 35, resets flip-flop 3NWR through OR-gate 34, and resets binary counter 65 through OR-gate 61. Switch 5NOR–SW is operated, contact 1 thereof extinguishing lamp 5FNL, indicating that the system is ready for information recording operation.

Power is made available to the system by operating and releasing start switch 5ST–SW to energize relay 5PA via a path from battery on lead 50 through the winding of relay 5PA, contact 2 of switch 50FF–SW, operated contact 1 of switch 5ST–SW, and contact 8 of relay 90PR1 to ground. Operation of relay 5PA completes a path from ground through contact 4 thereof and the winding of relay 5P0 to battery on lead 52, thereby energizing relay 5P0. This extends the power on lead 51 through operated contact 1 of relay 5P0 to energize relay 5M1. Operated contact 1 of relay 5P0 also extends power via lead 55 through the winding of relay 5IP to the ground on lead IP from control circuit 40. Relay 5IP is thus energized. Operated contact 2 of relay 5P0 and operated contact 1 of relay 5M1 provide a holding path to maintain relay 5PA energized when switch 5ST–SW is released. The battery on lead 50 also energizes relay 5T0 via a path completed through the winding of relay 5T0, the break portion of transfer contact 3 of relay 9TBL and the break portion of transfer contact 4 of relay 90PR1. The system may remain in this power available state between recording operations, with switch 5NOR–SW operated and with relays 5PA, 5P0 and 5T0 energized. If a power failure should occur at any time on any of leads 50, 51 or 52, this condition will be indicated by the release of relay 5PA, contact 1 thereof completing a path to light lamp 5PAL.

Information recording operation is initiated by operation of write switch 5WT–SW. Operated contact 1 of switch 5WT–SW completes a path from ground through operated contact 1 of switch 5CL–SW, operated contact 5 of switch 9LF–SW, and the winding of relay 5P1 to battery on lead 55. The operated condition of switches 5CL–SW and 9LF–SW necessary for the completion of this path insures the proper orientation of finger assembly 1240 and head assembly 1250 for information recording operation. A similar path is completed thereby through the break portion of contact 2 of relay 9TBL and the windings of relays 5P2, 5BRK1 and 5BRK2. Relays 5P1, 5P2, 5BRK1 and 5BRK2 are thus energized. Contact 1 of relay 5P1 operates to extend power from lead 51 to lead NB. Contact 1 of relay 5P2 extends power from lead 52 to lead PB. Operation of contact 2 of relay 5P1 provides a path for holding relay 5PA energized upon operation of contact 8 of relay 90PR1.

Battery on lead NB energizes relay 90PR via a path through the winding thereof, operated contact 2 of relay 5IP, the break portion of contact 2 of relay 5SP, operated contact 1 of switch 90R1–SW, the make portion of operated transfer contact 2 of switch 5NOR–SW, operated contact 2 of switch 5WT–SW, operated contact 1 of switch 9DN–SW, contact 2 of relay 8ALM and contact 4 of relay 9TBL to ground. Operated contact 2 of relay 90PR completes a path from lead NB through the winding of relay 90PR1, contact 4 of relay 8RLD and contact 4 of relay 9TBL to ground. Relay 90PR1 is energized in this path, and operated contact 2 thereof completes a holding path for relay 90PR through the latter relay's operated contact 1. Contact 5 of relay 90PR1 provides holding ground for relays 5P1, 5P2, 5BRK1 and 5BRK2 when switch 5WT–SW is released.

Operated contact 7 of relay 90PR1 completes a path from ground through the make portion of transfer contact 2 of switch 5CL–SW, contact 4 of relay 8FB, contact 2 of relay 8FF, the break portion of transfer contact 2 of relay 8RLD, the break portion of transfer contact 2 of relay 9REC, and the winding of relay 8U to lead NB. Relay 8U is energized in this path and operates contact 1 thereof to energize up solenoid 8URL via an obvious path. As described above, the energization of solenoid 8URL indexes mounting plate 1211 upward to make the first magnet card 1215 in magazine 1210 available for processing. The movement of plate 1211 upward from its home position releases switch 9DN–SW. The rotation of solenoid 8URL to index mounting plate 1211 upward operates switch 8UP–SW (not shown in FIG. 1), contact 1 of switch 8UP–SW completing an obvious path to energize relay 8UP.

The make portion of transfer contact 2 of switch 8UP–SW completes a path to energize relay 8FS. This path may be traced from ground through contact 4 of switch 9END–SW, the make portion of contact 2 of switch 8UP–SW, contact 3 of relay 8RLD, contact 7 of relay 8HL and the winding of relay 8FS to lead NB. Relay 8FS locks up through its own contact 1, the break portion of transfer contact 5 of relay 8HL and contact 2 of relay 8FB to ground. The operation of contact 4 of relay 8FS energizes finger solenoid 8FRL to rotate cam 1243 to the position shown in FIG. 2A. Grip fingers 1241 are thus urged upward to permit subsequent seizure of card 1215.

Contact 2 of relay 8FS completes a path from ground through contact 6 of relay 8HL and the winding of relay 8FF, thereby energizing relay 8FF. Relay 8FF locks up through its own contact 1 and contact 5 of relay 8FB. Relay 8U is released by the operation of contact 2 of relay 8FF, thus de-energizing solenoid 8URL and releasing switch 8UP–SW. Ground is extended by operated contact 5 of relay 8FF through the winding of relay 9F to lead PB, thereby energizing relay 9F. Operated contact 4 of relay 9FF prevents relay 9B from being energized. Contacts 1 and 2 of relay 9F operate to extend power on lead PB through the field winding and armature of motor 9FM and operated contact 1 of switch 9LF–SW to ground on lead GD. Motor 9HM is thus energized in the forward direction and operates in the manner described above to drive finger assembly 1240 forward toward mounting plate 1211 and card magazine 1210. Switch 5CL–SW is released as finger assembly 1240 approoches the vicinity of magazine 1210. When finger assembly 1240 reaches the forward position such that fingers 1241 thereof are positioned above slots 1216 of first magnet card 1215, forward switch 9FD–SW (not shown in FIG. 1) is operated thereby. Contact 1 of switch 9FD–SW shorts out the armature of motor 9FM to provide dynamic braking, thereby bringing the forward motion of finger assembly 1240 quickly to a halt.

The operation of switch 9FD–SW also, via contact 5 thereof, completes a path from ground through the break portion of transfer contact 4 of relay 8HL and the winding of relay 8FB to lead NB. Relay 8FB is energized in this path and locks up through its own contact 1 and the break portion of transfer contact 2 of relay 8HL to ground. Operated contact 7 of relay 8FB completes an obvious path energizing relay 9B, contacts 1 and 2 of which operate to prepare a path for reverse operation of motor 9FM upon release of relay 9F. Operated contact 2 of relay 8FB breaks the holding path for relay 8FS; and operated contact 5 of relay 8FB breaks one holding path for relay 8FF. However, relay 8FF is held energized by the holding path through contact 6 of relay 8HL and operated contact 2 of relay 8FS. When relay 8FS, and thus solenoid 8FRL, is de-energized, cam 1243 is rotated to the position shown in FIG. 2B, and spring 1244 urges grip finger 1241 downward to seize magnet card 1215 via slots 1216. However, the de-energization of relay 8FS is advantageously delayed for a predetermined time interval to insure that all forward motion of finger assembly 1240 has been halted, the delay being provided by the charging of capacitor 87 through resistor 88. The charging path for capacitor 87 may be traced from lead NB through the winding of relay 8FS, operated contact 1 of relay 8FS, the break portion of transfer contact 5 of relay 8HL, resistor 88 and capacitor 87 to ground.

When capacitor 87 has charged sufficiently to de-energize relay 8FS, the first magnet card 1215 is seized in the manner just described; and the holding path for relay 8FF is interrupted by the release of contact 2 of relay 9FS. Motor 9FM is energized in the reverse direction, upon the de-energization of relays 8FF and 9F, to withdraw card 1215 from magazine 1210. However, the de-energization of relay 8FF, and thus of relay 9F, is advantageously delayed for a predetermined time interval, in a manner similar to the delay provided before release of relay 8FS, to insure that fingers 1241 have closed to seize magnet card 1215. Only when capacitor 89 has charged sufficiently to de-energize relay 8FF, therefore, is relay 9F released and motor 9FM energized in the reverse direction. Until then relay 9F remains energized through operated contact 5 of relay 8FF, operated contact 1 of relay 9F maintaining a shorting connection across the armature of motor 9FM. Upon de-energization of relay 8FF and thus relay 9F, therefore, the shorting connection is removed from the armature of motor 9FM and relay 9B takes over reverse operation of motor 9FM. The reverse operating path for motor 9FM may be traced from lead PB through the field winding of motor 9FM, operated contact 2 of relay 9B, the armature of motor 9FM, operated contact 1 of relay 9B and operated contact 1 of switch 9LF–SW to lead GD.

Motor 9FM continues to drive finger assembly 1240 in the reverse direction, withdrawing first magnet card 1215 from magazine 1210 onto table 1230, until it is fully positioned thereon as shown in FIG. 1. Switch 9BK–SW (not shown in FIG. 1), is operated by finger assembly 1240 in this position. Operated contact 1 of switch 9BK–SW shorts out the armature of motor 9FM to provide dynamic braking, thereby bringing the motion of finger assembly 1240 quickly to a halt. The first magnet card 1215 is now positioned properly on table 1230 for information to be recorded thereon.

Contact 3 of switch 9BK–SW completes a path through the break portion of transfer contact 2 of switch 5CL–SW and operated contact 7 of relay 90PR1 to energize relay 8FF for purposes which will become apparent below. The operation of switch 9BK–SW also, via contact 2 thereof, completes a circuit from lead GD through the break portion of transfer contact 9 of relay 8HL and the winding of relay 9R to lead PB, energizing relay 9R. Operated contacts 1 and 2 of relay 9R complete a path to energize motor 9HM in the forward direction to drive transducer head assembly 1250 from left to right in FIG. 1. The energization path for motor 9HM may be traced from lead PB through the field winding of motor 9HM, operated contact 2 of relay 9R, the armature of motor 9HM, operated contact 1 of relay 9R and operated contact 2 of switch 9BK–SW. As head assembly 1250 moves away from its home position, switch 9LF–SW releases, thereby operating relay 8NL via an obvious path through contact 4 of switch 9LF–SW. The ground extended through the make portion of transfer contact 2 of relay 8NL resets flip-flop 3NL, thus removing the inhibit signal previously extended by flip-flop 3NL through OR-gate 31 on lead DG. Contact 1 of relay 8NL operates to provide an obvious alternate holding path for relay 8FB.

It will be recalled that each magnet card 1215 and 1215′ comprises a plurality of binary bit magnets 1217 arranged in coordinate rows and columns, each row corresponding to a word of information. Information is stored on a magnet card by selectively magnetizing and demagnetizing the binary bit magnets 1217, a magnetized bit magnet illustratively corresponding to a binary "0" and a nonmagnetized bit magnet illustratively corresponding to a binary "1." Transducer head assembly 1250 includes a plurality of transducers 1251 which move adjacent the respective columns of bit magnets 1217 on magnet card 1215, as shown in FIG. 10. Thus, a particular bit magnet 1217 in a row may be selectively magnetized or demagnetized by applying an appropriate signal to winding 1252 of a transducer 1251 when it is adjacent the particular bit magnet 1217. However, to insure that the magnetizing and demagnetizing signals are applied to windings 1252 only when transducers 1251 are accurately positioned with respect to a row of bit magnets 1217, position sensing apparatus is provided. Accurate position indications for this purpose may be derived advantageously from the individual positioning magnets 1218, which are accurately positioned with respect to each row of bit magnets 1217, through the use of position sensing devices 1260, such as shown in C. F. Ault-S. F. Rise III, application Serial No. 266,961, filed March 21, 1963.

A complete description of the operation of sensing devices 1260 will be found in the above Ault-Rise application and need not be repeated here. Sensing devices 1260 are driven by motor 9HM in a fixed positional relationship with transducers 1251 such that a sensing device 1260 passes adjacent a positioning magnet 1218 before, or at the same time that, transducers 1251 pass adjacent the row of bit magnets 1217 associated with the particular positioning magnet. In the illustrative embodiment herein, a sensing device 1260 passes adjacent the center of the positioning magnet 1218 immediately following a row of bit magnets 1217 at the same time that transducers 1251 pass adjacent the leading edge of the row of bit magnets. A pair of sensing devices 1260 may be employed, as shown in FIG. 10, with successive positioning magnets 1218 appearing in alternate columns, to minimize interaction between the fields of adjacent positioning magnets 1218. As a sensing device 1260 passes adjacent the center of one of positioning magnets 1218, a signal is induced in the respective winding 1261. Winding 1261 of each of sensing devices 1260 is connected via one terminal to ground through the break portion of transfer contacts 1 of relays 5HP1 and 5HP2, respectively, and via the other terminal to an associated one of detector-amplifiers 10DTA and 10DTB through the break portion of transfer contacts 2 of relays 5HP1 and 5HP2, respectively. Responsive to the signal induced in one of windings 1261, in the absence of an inhibit signal on lead DG, the associated detector-amplifier 10DTA or 10DTB provides a position indication on lead CT. As mentioned above, the inhibit signal normally present on lead DG is removed when switch 9LF–SW releases, energizing relay 8NL to set flip-flop 3NL. Each position indication appearing on lead CT as head assembly 1250 moves from left to right in FIG. 1, therefore, controls the recording of information in the row of bit magnets 1217 associated with the positioning magnet 1218 from which the position indication derived.

Input information to be recorded on magnet card 1215 and 1215′ is provided by source of information signals 41. The input information is presented in parallel form one word at a time for recording in a corresponding word row of bit magnets 1217. The bits of each word of input information, illustratively 44 bits, appear on respective input leads I00 through I43 to AND-gates 49 in response to a "word request" on leads WR and WDF. The AND-gates 49 are enabled by a signal on lead EN from information control circuit 40, thereby gating the bits of information appearing on leads I00 through I43 concurrently to respective input registers 4R00 through 4R43. Assuming input registers 4R00 through 4R43 to be in the reset condition initially, a bit of information of one binary character appearing on one of input leads I00 through I43 switches the respective input registers 4R00 through 4R43 to a set condition; and a bit of information of the other binary character allows the respective input registers 4R00 through 4R43 to remain in the reset condition. A word of input information thus stored in input registers 4R00 through 4R43 is reflected on leads R00 through R43, a signal on a lead indicating a bit of the one binary character and the absence of a signal indicating a bit of the other binary character. As will be described in detail below, a signal appearing on one of leads R00 through R43 results in a respective bit magnet 1217 on magnet card 1215 being placed in a magnetized condition, illustratively representative of a binary "0." Absence of a signal causes the respective bit magnet 1217 to be demagnetized, illustratively representative of a binary "1."

As just mentioned, information control circuit 40 provides information words only in response to a "word request" appearing on leads WR and WDF. Initially, flip-flop 3WDF is placed in a set condition by the ground on lead INIT1 and flip-flop 3WR is placed in a reset condition by the ground on lead INIT. This condition of flip-flops 3WDF and 3WR is reflected in the absence of signals on both of leads WDF and WR to information control circuit 40. This is the normal state of leads WR and WDF between "word requests." When flip-flop 3WR is set, a signal appears through OR-gate 39 on lead WR. Information control circuit 40 recognizes the appearance of a signal on lead WR only as a "word request" and accordingly provides a word of information on leads I00 through I43. As will be explained in greater detail hereinbelow, the concurrent appearance of signals on both of leads WR and WDF is recognized by information control circuit 40 as a trouble condition; and the appearance of a signal on lead WDF only is recognized as a failure of information control circuit 40 to deliver a requested word of information.

To recapitulate then, after first magnet card 1215 has been withdrawn from card magazine 1210 and positioned on recording table 1230, motor 9HM is energized to drive transducer head assembly 1250 from left to right in FIG. 1, transducers 1251 passing adjacent the respective columns of bit magnets 1217. Sensing devices 1260 pass adjacent the columns of positioning magnets 1218. A pair of magnetizing heads 1270, also driven by motor 9HM, precede sensing devices 1260 adjacent the columns of positioning magnets 1218. Windings 1271 of heads 1270 are each connected via one terminal to ground through the break portion of transfer contact 2 of relay 5HP3 and via the other terminal to source of potential 1275 through the break portion of transfer contact 1 of relay 5HP3. Heads 1270 thus function to magnetize each positioning magnet 1218 in a predetermined direction during relative motion therebetween.

Initially at this point, the system is looking via sensing devices 1260 for the first positioning magnet 1218 on the magnet card 1215 positioned on table 1230. As one of sensing devices 1260 passes adjacent this first positioning magnet 1218, a position indication is generated on lead CT. The first position indication on lead CT, and each successive position indication thereon, is provided to the input of pulse generator 3PGO, to the input of binary counter 60, and through OR-gate 36 to set flip-flop 3ERS. Delay pulse generator 3PGO, along with delay pulse generator 3PG1, controls the timing for the processing of each magnet card 1215 and 1215′. Specifically, delay pulse generator 3PGO is responsive to a position indication on lead CT to deliver an output pulse after a predetermined interval of time sufficient to permit energy build-up in transducer windings 1252, as described below, and to insure that transducers 1251 are adjacent the particular row of bit magnets 1217 associated with positioning magnet 1218 from which the position indication derived. Delay pulse generator 3PG1 defines the time interval for recording each word of information on the magnet cards. Thus delay pulse generator 3PG1 is responsive to a pulse from delay pulse generator 3PGO to provide a signal on lead MAG during the interval of time transducers 1251 are adjacent a row of bit magnets 1217 and thereafter to provide a pulse on lead RESET to prepare for recording the next successive word of information.

Binary counter 60 comprises a plurality of binary cells 6BC1 through 6BC7 interconnected to count successive position indications appearing on lead CT. Each position indication on lead CT advances counter 60 through its successive stages, counter 60 thus providing a count indication of the particular row of bit magnets 1217 adjacent transducers 1251 for recording purposes. Each advance of counter 60 provides a signal through AND-NOT gate 62 on lead WRS until the count in counter 60 reaches "64", which corresponds to the number of word rows on an illustrative magnet card. When counter 60 is advanced to "65" no signal appears through AND-NOT gate 62 on lead WRS. The reset state output terminal of each of binary cells 6BC1 through 6BC7 is connected to AND-gate 63, thereby providing a signal on lead NWR only when the count in counter 60 is zero. The reset terminal of each of cells 6BC1 through 6BC7 is connected to lead INIT to reset counter 60 when a ground signal apperas on lead INIT.

When the first positioning magnet 1218 is detected by one of the sensing devices 1260, therefore, a signal on lead CT energizes delay pulse generator 3PGO, sets flip-flop 3ERS and advances counter 60 to a count of one. Counter 60 provides an output signal through AND-NOT gate 62 on lead WRS to enable AND-gate 33. The AND-gate 33 remains enabled by counter 60 until the count therein advances to "65". When generator 3PGO times out is provides a pulse to energize delay pulse generator 3PG1, which upon timeout provides a pulse on lead RESET through enabled AND-gate 33 to set flip-flop 3WR. In response to the change of state of flip-flop 3WR, thus placing a signal through OR-gate 39 on lead WR, information control circuit 40 provides the first word of information on leads 100 through 143. An enable signal on lead EN from information control circuit 40 gates the word of information into registers 4R00 through 4R43, in the manner indicated above, the information thus appearing on leads R00 through R43. The enable signal on lead EN is also provided throught OR-gate 37 to reset flip-flop 3WR.

When the second positioning magnet 1218 is subsequently detected by one of sensing devices 1260, transducers 1251 are in proximity of the first row of bit magnets 1217 on magnet card 1215. The position indication on lead CT from one of detectors 10DTA and 10DTB again energizes delay pulse generator 3PGO, sets flip-flop 3ERS and advances counter 60 to a count of two. The set condition of flip-flop 3ERS provides a signal on lead ERS to energize oscillator 70SC. Oscillator 70SC, when energized, provides successive symmetrical pulses at a predetermined frequency alternately on leads EA and EB to an input of each of recording circuits 7RE00 through 7RE43. The first word of information previously stored in registers 4R00 through 4R43 is provided on leads R00 through R43 to recording circuits 7RE00 through 7RE43. Battery is provided via source of potential 75 through the break portion of transfer contact 1 of relay 5HP4 on lead P1 to another input of each of recording circuits 7RE00 through 7RE43. The remaining input to recording circuits 7RE00 through 7RE43 is provided by lead MG which is derived from the output of AND-gate 74.

One input to AND-gate 74 is connected to lead MAG and the other input is connected to an output of flip-flop 7MAG. The set terminal of flip-flop 7MAG is connected to lead GG1, and thus flip-flop 7MAG is set when delay pulse generator 3PGO times out. The reset terminal of flip-flop 7MAG is connected to the outputs of AND-gates 72 and 73. The AND-gate 73 is connected via one input to ground through the break portion of transfer contact 2 of relay 5HP4, and is thus enabled to gate each pulse appearing on lead EA to reset flip-flop 7MAG. Accordingly, flip-flop 7MAG is reset by the first pulse appearing on lead EA, and it remains reset until delay pulse generator 3PGO times out and provides a pulse on lead GG1 to set flip-flop 7MAG. At the same time, the pulse from generator 3PGO energizes delay pulse generator 3PG1 to provide a signal on lead MAG to enable AND-gate 74. The next successive pulse on lead EA, therefore, resets flip-flop 7MAG to provide a signal through AND-gate 74 on lead MG, which remains until delay pulse generator 3PG1 times out.

The operation of suitable record-erase circuitry for employment in recording circuits 7RE00 through 7RE43 is described in C. F. Ault-D. Friedman application Serial No. 266,959, filed March 21, 1963. Briefly, however, each of recording circuits 7RE00 through 7RE43 is connected via leads RE00 through RE43 to a respective transducer winding 1252. An information signal appears on one of register leads R00 through R43 if the corresponding bit magnet 1217 is to be magnetized, and no signal appears thereon if the corresponding bit magnet is to be demagnetized. Responsive to the alternating pulses on leads EA and EB, in the absence of an information signal on the respective register lead R00 through R43, a recording circuit 7RE00 through 7RE43 applies a demagnetizing current to the transducer winding 1252 connected thereto. If an information signal appears on the respective register lead R00 through R43, a recording circuit 7RE00 through 7RE43 responds to the appearance of a signal on lead MG to apply a magnetizing current to the transducer winding 1252 connected thereto. The polarity of the magnetizing current is determined by the timing of the signal on lead MG and by which of leads P1 and P2 is energized. When magnet cards 1215 are being processed, the signal on lead MG is provided by a pulse on lead EA resetting flip-flop 7MAG and lead P2 is energized.

Assume, for example, that bit magnet 1217 adjacent transducer 1251 connected to recording circuit 7RE00 is to be demagnetized, as indicated by the absence of a signal on lead R00. Capacitors 78*a* and 78*b* are connected in series with transducer winding 1252 to form a ringing circuit. Initially capacitors 78*a*, 78*b* and 79 in recording circuit 7RE00 are charged to a reference potential by sources of potential 76. Transistors Q1 and Q2 are biased in the nonconducting, high impedance state. A position indication on lead CT energizes generator 3PG0 and sets flip-flop 3ERS to energize oscillator 70SC. Oscillator 70SC generates pulses alternately on leads EA and EB, as shown in FIGS. 12(*c*) and 12(*d*), at a frequency substantially equal to the resonant frequency of the ringing circuit comprising capacitors 78*a* and 78*b* and winding 1252. The pulses on lead EA are applied through OR-gate 7EA to pulse transistor Q1 to a conducting state; and the pulses on lead EB are applied through OR-gate 7EB to pulse transistor Q2 to a conducting state. When one of transistors Q1 and Q2 is in a conducting state, a respective one of capacitors 78*a* and 78*b* is connected therethrough to ground. Thus, the pulses appearing alternately on leads EA and EB, respectively, pulse capacitors 78*a* and 78*b* alternately to ground, generating a demagnetizing alternating current in transducer winding 1252, such as graphically represented in FIG. 12(*e*). Capacitors 79 discharge into the ringing circuit to increase initially the magnitude of the demagnetizing current to assure control of the magnetic switching of the bit magnet 1217 being demagnetized. Thereafter the magnitude of the demagnetizing current decreases to a value determined and maintained principally by sources 76 and resistors 77, sufficient to assure continued control of the bit magnet until transducer 1251 is no longer adjacent thereto. This minimizes the effect on the demagnetized bit magnet of any adjacent magnetizing fields. Now assume that bit magnet 1217 adjacent transducer 1251 connected to recording circuit 7RE00, for example, is to be magnetized, as indicated by a signal on lead R00. Recording operation is initiated in the manner described above, pulses appearing alternately on leads EA and EB pulsing capacitors 78*a* and 78*b* alternately to ground to generate an alternating current in transducer winding 1252. The magnitude of the alternating current increases initially due to the discharge of capacitors 79, and is above a predetermined magnitude when delay pulse generator 3PG0 times out, at time $t_1$ in FIG. 12, to set flip-flop 7MAG, energizing delay pulse generator 3PG1 to enable AND-gate 74. The next subsequent pulse apearing on lead EA at time $t_2$ resets flip-flop 7MAG to provide a signal on lead MG, as illustrated in FIG. 12(*f*), which remains until generator 3PG1 times out. The AND-gate 7P1 is enabled by signals on leads R00 and P1 to direct the signal on lead MG through OR-gate 7EA to clamp transistor Q1 to a conducting state. Capacitor 78*a* is thus clamped to ground; and capacitor 78*b* discharges through winding 1252 toward this ground, generating a magnetizing current spike in winding 1252 to magnetize the bit magnet 1217 adjacent the respective transducer 1251. A graphical representation of the magnetizing current thus generated in a transducer winding 1252 is shown in FIG. 12(g).

The demagnetizing and magnetizing currents are applied to the respective transducer windings 1252 by recording circuits 7RE00 through 7RE43, in accordance with the information registered in registers 4R00 through 4R43, until delay pulse generator 3PG1 times out. Timeout of delay pulse generator 3PG1 terminates the signal on lead MAG, and thus the signal on lead MG, and further provides a pulse on lead RESET to reset flip-flop 3ERS and to reset registers 4R00 through 4R43. The resetting of flip-flop 3ERS de-energizes oscillator 7OSC. The pulse on lead RESET also sets flip-flop 3WR through enabled AND-gate 33 to request the next word of information from information control circuit 40. Information control circuit 40 registers the second word of information in registers 4R00 through 4R43, the enable signal on lead EN resetting flip-flop 3WR. The next successive positioning magnet 1218 is detected to provide a position indication on lead CT, and the second word of information is recorded on the second row of bit magnets 1217 in the manner described above.

This manner of information recording operation continues until information has been recorded in each row of bit magnets 1217 of first magnet card 1215 on table 1230. When the positioning magnet 1218 associated with the last row of bit magnets 1217 is detected, the indication thereof on lead CT advances counter 60 to a count of "65". Thus all of the inputs to AND-NOT gate 62 are energized, removing the enable signal on lead WRS to AND-gate 33. Accordingly, when delay pulse generator 3PG1 times out after recording of the 64th word of information is completed, the pulse on lead RESET resets registers 4R00 through 4R43 and resets flip-flop 3ERS, but it is blocked by the disablement of AND-gate 33 from setting flip-flop 3WR to request another word of information.

The movement of transducer head assembly 1250 continues toward the right in FIG. 1 until the switch 9RT–SW (not shown in FIG. 1) is operated thereby. Operation of contact 3 of switch 9RT–SW completes an obvious path setting flip-flop 3HL to provide an inhibit signal through OR-gate 31 on lead DG to detectors 10DTA and 10DTB. Operated contact 1 of switch 9RT–SW shorts out the armature of motor 9HM to bring motion of head assembly 1250 quickly to a halt. The operation of switch 9RT–SW also, via contact 2, energizes relay 8HL which locks up to ground through its own contact 1 and operated contact 3 of relay 8FF. Operation of detectors 10DTA and 10DTB is also inhibited by a signal provided through OR-gate 31 on lead DG by the operation of contact 10 of relay 8HL. Operation of transfer contact 9 of relay 8HL de-energizes relay 9R and energized relay 9L through an obvious circuit. The shorting connection is removed from the armature of motor 9HM by the release of contact 1 of relay 9R contacts 1 and 2 of relay 9L reverse the previous path through the armature and field winding of motor 9HM to drive head assembly 1250 toward the left in FIG. 1. This operating path for motor 9HM may be traced from lead PB through the field winding of motor 9HM, operated contact 2 of relay 9L, the armature of motor 9HM, operated contact 1 of relay 9L, and operated contact 2 of switch 9BK–SW to lead GD. When head assembly 1250 reaches its home position at the left in FIG. 1, switch 9LF–SW is operated, contact 2 thereof shorting out the armature of motor 9HM. Head assembly 1250 is thus stopped in its home position.

Operated contact 4 of switch 9LF–SW de-energizes relay 8NL. Ground is accordingly extended via the break portion of transfer contact 2 of relay 9NL on lead INIT to set flip-flop 3NL, to reset flip-flop 3HL and to reset binary counter 60 to zero. Operated contact 10 of relay 8HL maintains the inhibit signal on lead DG during the setting of flip-flop 3NL. Thereafter, flip-flop 3NL in the set condition insures the continuation of the inhibit signal on lead DG after release of relay 8HL and until relay 8NL is again operated.

Release of contact 1 of relay 8NL interrupts the holding path for relay 8FB. Relay 8FB releases, contact 5 thereof completing a holding path for relay 8FF through the latter's operated contact 1. Release of contact 7 of relay 8FF de-energizes relay 9B, contact 1 of which releases to remove the shorting connection from the armature of motor 9FM. Relay 9F remains energized via the path through operated contact 5 of relay 8FF, and contacts 1 and 2 of relay 9F complete a path to energize motor 9FM to drive finger assembly 1240 forward. The operating path for motor 9FM may be traced from lead PB through the field winding of motor 9FM, operated contact 2 of relay 9F, the armature of motor 9FM, operated contact 1 of relay 9F and operated contact 1 of switch 9LF–SW to lead GD.

Finger assembly 1240 is driven forward by motor 9FM, pushing the first magnet card 1215 from table 1230 toward magazine 1210. The magnet card 1215 just procesed is reinserted in magazine 1210 in this manner, being returned to the slot or groove therein from which it was previously withdrawn. When finger assembly 1240 reaches the forward position such that magnet card 1215 is fully inserted in magazine 1210, forward switch 9FD–SW is operated. Forward motion of finger assembly 1240 is stopped, contact 1 of switch 9FD–SW shorting out the armature of motor 9FM to provide dynamic braking.

A path is completed from ground through operated contact 5 of switch 9FD–SW, the make portion of transfer contact 4 of relay 8HL and the winding of relay 8FS to lead NB. Relay 8FS is energized in this path, contact 4 thereof completing an obvious path to energize solenoid 8FRL. Solenoid 8FRL rotates cam 1243 to the position shown in FIG. 2A, urging fingers 1241 upward clear of slots 1216 in magnet card 1215. Finger assembly 1240 is now disengaged from first magnet card 1215 and ready to be backed away from mounting plate 1211 so that magazine 1210 may be indexed upward to the next magnet card 1215.

The operation of contact 1 of relay 8FS completes a path to energize relay 8FB. This path may be traced from ground through contact 5 of switch 9FD–SW, the make portion of transfer contact 4 of relay 8HL, operated contact 1 of relay 8FS, the make portion of transfer contact 5 of relay 8HL, and the winding of relay 8FB to lead NB. Relay 8FB locks up through its contact 1, the make portion of transfer contact 2 of relay 8HL, contact 4 of switch 9BK–SW, the break portion of transfer contact 2 of switch 5CL–SW, and operated contact 7 of relay 90PR1 to ground. The locking path just traced also provides a holding path from relay 8FS through the make portion of contact 5 of relay 8HL and operated contact 1 of relay 8FS. Contact 5 of relay 8FB operates to break the holding path for relay 8FF, which releases after a delay provided by the charging of capacitor 89 through contact 1 of relay 8FF. This delay in de-energizing relay 8FF insures that cam 1243 has rotated sufficiently to disengage fingers 1241 from slots 1216 of magnet card 1215 just reinserted into magazine 1210.

Upon the subsequent de-energization of relay 8FF, contact 5 thereof releases to de-energize relay 9F. Relay 9B remains energized through the obvious path including operated contact 7 of relay 8FB. Release of contact 1 of relay 9F removes the shorting connection from the armature of motor 9FM, and motor 9FM is energized in the reverse direction to back finger assembly 1240 away from mounting plate 1211 toward the home position of finger assembly 1240. The reverse operating path for motor 9FM has been traced previously through operated contacts 1 and 2 of relay 9F and operated contact 1 of switch 9LF–SW. The movement of finger assembly 1240 releases switch 9FD–SW, and when assembly 1240 is clear of mounting plate 1211 and magazine 1210 operates switch 5CL–SW.

Operation of switch 5CL–SW, via the break portion of its transfer contact 2, interrupts the holding path previously traced for relays 8FB and 8FS. Relays 8FB and 8FS release, contacts 3 thereof de-energizing relay 8HL. Release of contact 4 of relay 8FB completes a path to energize relay 8U, which path may be traced from ground through operated contact 7 of relay 90PR1, the make portion of transfer contact 2 of switch 5CL–SW, contact 4 of relay 8FB, contact 2 of relay 8FF, the break portion of transfer contact 2 of relay 8RLD, the break portion of transfer contact 2 of relay 9REC and the winding of relay 8U to lead NB. Operated contact 1 of relay 8U completes an obvious path to energize solenoid 8URL, which operates to index mounting plate 1211 upward one step in the manner described hereinabove. The second magnet card 1215 in magazine 1210 is thus placed on a level with processing table 1230.

The operation of switch 5CL–SW, de-energizing relay 8FB also de-energizes motor 9FM to stop rearward drive of finger assembly 1240. Rearward drive of finger assembly 1240 is thus stopped in its home position, advantageously precluding the necessity for driving finger assembly 1240 to its back position before reversing its motion in the forward direction to engage the next successive magnet card from magazine 1210. When relay 8FB is de-energized, release of contact 7 thereof de-energizes relay 9B. Contacts 1 and 2 of relay 9B releases to interrupt the operating path for motor 9FM. However, finger assembly 1240 continues to coast in the rearward direction until a shorting connection is placed across the armature of motor 9FM. This is effected by the operation of contact 2 of relay 8U extending ground through contact 6 of relay 8FB to energize relay 9F and through contact 4 of relay 8FF to energize relay 9B. Contacts 1 of relays 9F and 9B operate to complete the path shorting out the armature of motor 9FM, stopping rearward movement of finger assembly 1240 in a position such that switch 5CL–SW is maintained operated thereby.

The rotation of solenoid 8URL in indexing mounting plate 1211 upward one step operates switch 8UP–SW, contact 1 of which completes an obvious path to energize relay 8UP. Contact 1 of relay 8UP extends ground through OR-gate 61 to reset binary counter 65. The make portion of transfer contact 2 of switch 8UP–SW operates to complete a path from ground through contact 4 of switch 8END–SW, contact 2 of switch 8UP–SW, contact 3 of relay 8RLD, contact 7 of relay 8HL and the winding of relay 8FS to lead NB. Relay 8FS is energized in this path, contact 4 thereof completing an obvious path to energize solenoid 8FRL. Cam 1243 is rotated by energized solenoid 8FRL to urge fingers 1241 upward to permit subsequent seizure of second magnet card 1215. Relay 8FS locks up through its contact 1, the break portion of contact 5 of relay 8HL and contact 2 of relay 8FB to ground.

Relay 8FF is energized via a path completed by operated contact 2 of relay 8FS through contact 6 of relay 8HL, and relay 8FF locks up through its contact 1 and contact 5 of relay 8FB to ground. Contact 4 of relay 8FF breaks the operating path for relay 9B, and contact 5 of relay 8FF establishes an alternate operating path for relay 9F. Release of relay 9B, and thus contacts 1 and 2 thereof, removes the shorting condition from the armature of motor 9FM. Contacts 1 and 2 of relay 9F remain operated to provide a previously traced path energizing motor 9FM in the forward direction. Finger assembly 1240 is driven forward by motor 9FM, releasing switch 5CL–SW as assembly 1240 reaches the vicinity of mounting plate 1211. This in turn, via release of transfer contact 2 of switch 5CL–SW, breaks the operating path for relay 8U. Contact 1 of relay 8U releases, de-energizing solenoid 8URL, thereby releasing switch 8UP–SW.

Finger assembly 1240 continues to be driven forward by motor 9FM until it is positioned for seizure of second magnet card 1215, thereby operating switch 9FD–SW. Subsequent operation of the system is the same as that described above in connection with the first magnet card 1215. Contact 1 of switch 9FD–SW shorts out the armature of motor 9FM and contact 2 of switch 9FD–SW completes a path to energize relay 8FB. Energization of relay 9FB breaks the holding path for relay 8FS which, after a delay determined by capacitor 87 and resistor 88, releases to de-energize solenoid 8FRL and to break the holding path for relay 8FF. Solenoid 8FRL returns to its rest position, permitting finger assembly 1240 to seize the second magnet card 1215 via slots 1216 therein. After a delay determined by the charging of capacitor 89, relay 8FF is de-energized to release relay 9F, removing the shorting connections from the armature of motor 9FM. Relay 9B remains operated by relay 8FB and energizes motor 9FM in the reverse direction to withdraw the second magnet card 1215 from magazine 1210 onto table 1230. Switch 9BK–SW operates to brake motor 9FM and to initiate operation of motor 9HM to drive transducer head assembly 1250. When the second magnet card 1215 had been processed, and head assembly 1250 returned to its home position, the second magnet card 1215 is reinserted in magazine 1210.

The above operation is repeated until all of magnet cards 1215 have been processed. After information control circuit 40 has provided the last word of information on leads I00 through I43 for last magnet card 1215, a ground signal is applied on lead SP energizing relay 5SP to indicate that subsequent words of information from circuit 40 are for recordation on magnet cards in orientation "B," i.e., magnet cards 1215′. When the last magnet card 1215 has been returned to magazine 1210, finger assembly 1240 is backed away from mounting plate 1211 and brought to a stop in the same manner as after processing each of the previous magnet cards 1215. Switch 5CL–SW is operated by finger assembly 1240 to complete the path traced above for energizing relay 8U. Operation of contact 1 of relay 8U energizes solenoid 8URL to index mounting plate 1211 upward. However, movement of mounting plate 1211 upward after processing the last magnet card 1215 operates switch 9END–SW. Operated contact 4 of switch 9END–SW prevents the normal energization of relay 8FS, and thus of relay 8FF.

Relay 9INV is energized via a path through operated contact 2 of switch 9END–SW, the make portion of transfer contact 4 of relay 90PR, the make portion of transfer contact 3 of relay 5IP, the make portion of transfer contact 3 of relay 5SP and the break portion of transfer contact 3 of relay 50R2. Relay 9INV locks up through its contact 1 and, via operated contact 2 thereof, completes an obvious path to light lamp 9INVL. Operated contact 3 of relay 9INV completes a path from ground through operated contact 3 of relay 90PR, contact 1 of switch 8AO–SW, and the winding of relay 8ALM to lead NB. Relay 8ALM is energized in this path, locking up through its contact 1 and contact 1 of switch 8AO–SW. Contact 3 of relay 8ALM completes a path through the break portion of transfer contact 1 of relay 8BO to operate buzzer 8BZ. The visual and audible indications provided by light 5INVL and buzzer 8BZ, respectively, signal an operator that all of the magnet cards in orientation "A," i.e., magnet cards 1215, have been processed.

Contact 5 of switch 9END-SW completes an obvious path from ground through the winding of relay 8RLD, which is energized thereby and locks up through its contact 1. Relay 8D is energized by the closure of the make portion of transfer contact 2 of relay 8RLD. This path may be traced from lead NB through the winding of relay 8D, contact 2 of relay 8RLD, contact 2 of relay 8FF, contact 4 of relay 8FB, the make portion of transfer contact 2 of switch 5CL–SW, and operated contact 7 of relay 90PR1 to ground. Operation of the break portion of transfer contact 2 of relay 8RLD interrupts the operating path for relay 8U, thereby de-energizing relay 8U and solenoid 8URL. Operated contact 2 of relay 8D maintains relays 9F and 9B energized upon release of contact 2 of relay 8U, thereby continuing the shorting connection across the armature of motor 9FM. The energization of relay 8D, via operated contact 1 thereof, completes an obvious path to energize solenoid 8DRL. As described in detail above, energization of solenoid 8DRL rotates trip arm 1227 to trip both hold pawl 1221 and advance pawl 1222 from engagement with rack 1229. Mounting plate 1211 is thus permitted to descend down guide rods 1212 to its lowermost, or home, position. Switch 9DN–SW is operated to indicate when plate 1211 is in its home position.

The operation of contact 3 of switch 9DN–SW breaks the holding path for relay 90PR1, de-energizing relay 90PR1. Release of contacts 2 and 7 of relay 90PR1 breaks the operating paths for relays 90PR and 8D, respectively, de-energizing these relays. Release of contact 1 of relay 8D de-energizes solenoid 8DRL, permitting pawls 1221 and 1222 to return to positions in engagement with rack 1229 on mounting plate 1211. Release of contact 5 of relay 90PR1 breaks the normal holding path for relays 5P1, 5P2, 5BRK1 and 5BRK2, but these relays are temporarily held operated via a path through operated contact 4 of relay 8ALM. Release of contact 9 of relay 90PR1 places ground on lead INIT1 to place initial conditions on flip-flop 3NWR, 3WDF and 3ERS.

The audible and visual indications provided by buzzer 8BZ and lamp 5INVL continue until an operator operates switch 8B0–SW or switch 8A0–SW. Operation and release of switch 8B0–SW terminates the audible alarm by completing an obvious path to energize relay 8B0, the make portion of transfer contact 1 thereof locking up relay 8B0 and the break portion of contact 1 interrupting the operating path for buzzer 8BZ. The visual indication of lamp 5INVL continues if only switch 8B0–SW is operated. However, operation and release of switch 8A0–SW, via contact 1 thereof, de-energizes relay 8ALM and thus both buzzer 8BZ and light 5INVL. Release of contact 3 of relay 8ALM interrupts the operating path for buzzer 8BZ. Release of contact 4 of relay 8ALM breaks the holding path for relays 5P1, 5P2, 5BRK1 and 5BRK2. Consequently de-energization of relays 5P1 and 5P2, via release of contacts 1 thereof, removes power from leads NB and PB, respectively. Removal of power from lead NB de-energizes relays 9INV and 9END, release of contact 2 of relay 9INV extinguishing lamp 9INVL.

At this point the mounting plate 1211 is in its home position operating switch 9DN–SW, finger assembly 1240 is clear of mounting plate 1211 operating switch 5CL–SW, head assembly 1250 is in its home position operating switch 9LF–SW, and initial conditions have been placed on counters 60 and 65 and on flip-flops 3HL, 3NL, 3NWR, 3WDF, 3ERS and 3WR. Relay 5PA remains operated, a holding path in shunt with released contact 2 of relay 5PI being provided by released contact 8 of relay 90PR1. Relay 5P0 is thus maintained operated via a path through contact 4 of relay 5PA. Relay 5T0 remains operated via a path through the break portion of transfer contact 4 of relay 90PR1 and the break portion of transfer contact 3 of relay 9TBL. Accordingly, the system has been restored to its initial power available condition, ready for processing magnet cards 1215′ as soon as the operator removes magazine 1210 and repositions it on mounting plate 1211 in orientation "B."

Should switch 5WT–SW be operated to begin information recording operation, without repositioning magazine 1210 in orientation "B," relay 9INV is energized to light lamp 5INVL. The path for energizing relay 9INV may be traced from ground through the break portion of transfer contact 3 of relay 0R2, the make portion of transfer contact 3 of relay 5SP, the make portion of transfer contact 3 of relay IP, the break portion of transfer contact 4 of relay 90PR and and the winding of relay 9INV to lead NB. Power is provided to lead NB through contact 1 of relay 5P1 which is operated when switch 5WT–SW is operated. Relay 90PR is prevented from operating by the unoperated condition of contact 1 of switch 90R2–SW. Therefore, lamp 5INVL is extinguished upon release of switch 5WT–SW inasmuch as release of contact 1 of switch 5WT–SW de-energizes relay 5P1, removing power from lead NB and de-energizing relay 9INV.

Assuming then that card magazine 1210 has been properly positioned on mounting plate 1211 in orientation "B," switch 90R2–SW is operated thereby. Contact 2 of switch 90R2-SW completes an obvious path to energize relay 90R2. Operation of contact 5 of relay 50R2 completes an obvious path for energizing relays 5HP1, 5HP2, 5HP3 and 5HP4. Transfer contacts 1 and 2 of each of relays 5HP1 and 5HP2 reverse the connections of windings 1261 of devices 1260 between ground and detectors 10DTA and 10DTB. Transfer contacts 1 and 2 of relay 5HP3 similarly reverse the connections of winding 1271 of heads 1270 between ground and source of potential 1275. Transfer contact 1 of relay 5HP4 operates to connect source of potential 75 to lead P2; and transfer contact 2 of relay 5HP4 operates to enable AND-gate 72. Relays 5HP1 through 5HP4 thus operate to reverse all polarity connections for magnetizing bit magnets 1217 and initializing magnets 1218 during orientation "B" processing.

Operation and release of switch 5WT–SW initiates information recording operation on magnet cards 1215′ in the same manner as above-described for magnet cards 1215. Contact 1 of switch 5WT–SW operates to energize relays 5P1 and 5P2, operated contacts 1 of which extend power to leads NB and PB, respectively. Power of lead NB operates relay 90PR via a path through the winding thereof, operated contact 2 of relay 5IP, the make portion of transfer contact 2 of relay SP, operated contact 1 of switch 90R2–SW, the make portion of switch 5NOR–SW, operated contact 2 of switch 5WT–SW, operated contact 1 of switch 9DN–SW, contact 2 of relay 8ALM and contact 4 of relay 9TBL to ground. Relay 90PR1, and thus relay 8U, operate via paths traced hereinabove to index mounting plate 1211 upward one step, placing first magnet card 1215′ on a level with processing table 1230.

The first magnet card 1215′ and each subsequent magnet card 1215′ is withdrawn from magazine 1210 processed and reinserted in magazine 1210 in the same manner as described above in connection with magnet cards 1215. After the 64th word of information is delivered by information control circuit 40 on leads I00 through I43 for recordation on the last magnet card 1215′, control circuit 40 removes the ground signals from leads SP and IP. Relays 5SP and 5IP are thus de-energized to indicate that the last word of information for the particular magazine 1210 of magnet cards 1215 and 1215′ has been provided on leads I00 through I43 for recordation. Thus, when the last magnet card 1215′ has been processed and returned to magazine 1210, and mounting plate 1211 is indexed upward to operate switch 9END–SW, a path is completed via contact 1 thereof to operate relay 9END. This path may be traced from ground through operated contact 1 of switch 9END–SW, operated contact 4 of relay 50R2, contacts 4 of relays 5IP and 5SP, and the winding of relay 9END to lead NB.

Relay 9END locks up through its contact 1 and lights lamp 5ENDL via an obvious path completed through contact 2 of relay 9END. Operated contact 3 of relay 9END completes a path from ground through operated contact 3 of relay 90PR, contact 1 of switch 8AO–SW and the winding of relay 8ALM to lead NB. Relay 8ALM is energized in this path and locks up through its contact 1. Relay 8ALM also completes a path via its contact 3 to energize buzzer 8BZ. Buzzer 8BZ and light 5ENDL provide audible and visual indications to an operator that information recording operation has been completed. Operation and release of switch 8AO–SW terminates these indications in the manner described above.

Mounting plate 1211 is automatically returned to its home position in the same manner as upon completed processing of magnet cards 1215. Operated contact 5 of switch 9END–SW completes a path to energize relay 8RLD, the make portion of transfer contact 2 of which completes a path to operate relay 8D. Contact 1 of relay 8D operates to energize solenoid 8DRL which rotates trip arm 1227 to trip hold pawl 1221 and advance pawl 1222. Mounting plate 1211 is thus permitted to descend to its home position. Accordingly, upon termination of the audible and visual indications by operation of switch 8AO–SW, thereby removing power from leads NB and PB, the system is returned to its initial power available condition ready for further information recordation upon a subsequent magazine of magnet cards being positioned on mounting plate 1211.

*Recycle operation*

If the system fails to process a magnet card during the above-described sequence of operations, the card is recycled automatically and a second attempt is made to record information thereon. Such failure may occur, for example, if a word request is not answered by information control circuit 40. It will be recalled that a word information is requested each time delay pulse generator 3PG1 provides a pulse on lead RESET through AND-gate 33 to set flip-flop 3WR. The set condition of flip-flop 3WR, coincident with the set condition of flip-flop 3WDF, is reflected on leads WR and WDF to request a word of information from information control circuit 40. When information control circuit 40 delivers the requested word of information on leads I00 through I43, a signal therefrom on lead EN resets flip-flop 3WR through OR-gate 37.

Assuming information control circuit 40 fails to provide the requested word of information, and thus that no signal appears on lead EN, flip-flop 3WR remains in the set condition. Head assembly 1250 continues to move toward the right, and the next initializing magnet 1218 is detected to produce a signal on lead CT. Delay pulse generator 3PGO is energized as usual by the signal on lead CT and upon time-out, applies pulse to an input of AND-gate 32. The AND-gate 32 is enabled by the set condition of flip-flop 3WR to provide the pulse to the reset terminal of flip-flop 3WDF, resetting flip-flop 3WDF. The reset condition of flip-flop 3WDF is reflected on lead NRD through OR-gate 37 to reset flip-flop 3WR. The reset condition of flip-flop 3WDF, coincident with the reset condition of flip-flop 3WR, is reflected as a signal through OR-gate 38 on lead WDF. No signal appears on lead WR. This state of leads WDF and WR indicates to information control circuit 40 that the magnet card presently being processed is to be recycled. Information control circuit 40 is responsive thereto to provide the proper words of information on leads I00 through I43 during recycle operation.

An output signal is provided by the reset condition of flip-flop 3WDF through OR-gate 3INH on lead INH through operated contact 6 of relay 90PR to energize recycle control relay 9REC. Transducer head assembly 1250 completes its pass of the magnet card on table 1230 and returns to its home position. Finger assembly 1240 is energized in the normal manner to reinsert the magnet card in magazine 1210 and to back away until switch 5CL–SW is operated. At this point relay 8U is normally energized to index mounting plate 1211 upward one step. However, the operating path for relay 8U is broken by the operation of the break portion of transfer contact 2 of relay 9REC, preventing relay 8U from being energized. The make portion of transfer contact 2 of relay 9REC completes a path to energize relay 8FS. This path may be traced from lead NB through the winding of relay 8FS, contact 7 of relay 8HL, transfer contact 2 of relay 9REC, the break portion of transfer contact 2 of relay 8RLD, contact 2 of relay 8FF, contact 4 of relay 8FB, the make portion of transfer contact 2 of switch 5CL–SW, and operated contact 7 of relay 90PR1 to ground.

Relay 8FS locks up through its contact 1, the break portion of transfer contact 5 of relay 8HL and contact 3 of relay 8FB. Solenoid 8FRL is energized via operated contact 4 of relay 8FS to open fingers 1241. Relay 8FF is energized via a path completed through operated contact 2 of relay 8FS and contact 6 of relay 8HL, locking up through its contact 1 and contact 5 of relay 8FB. Motor 9FM is thus energized to drive finger assembly 1240 forward to seize and withdraw the same magnet card to be recycled. When the card has been positioned again on table 1230, information recording operation continues in the normal manner as if this were the first time the magnet card had been positioned for recording, information control circuit 40 again providing the proper words of information for recordation on the particular magnet card.

Each time a magnet card is withdrawn from magazine 1210, the operation by finger assembly 1240 of switch 5CL–SW completes a path to set flip-flop 3WDF through OR-gate 35 and to reset flip-flop 3NWR through OR-gate 34. This path may be traced through operated contact 8 of relay 8FB, contact 11 of relay 8HL and operated contact 3 of switch 5CL–SW. Thus, flip-flop 3WDF is set when the first magnet card is withdrawn from magazine 1210 and remains set throughout the processing of all of the magnet cards in the magazine unless it is reset by a word delivery failure as described above. Binary counter 65 comprises a pair of binary cells 6BC8 and 6BC9 interconnected to be advanced by signals on lead INH and to provide a signal on lead RTS when the count therein reaches three. Counter 65 is reset at the beginning of orientation "A" and orientation "B" processing by a signal on lead INIT1 through OR-gate 61. Counter 65 is also reset prior to processing each individual magnet card by a signal through OR-gate 61 upon operation of contact 1 of relay 8UP. Binary counter 65 thus remains reset unless a signal appears on lead INH, such as when flip-flop 3WDF is reset to indicate a word delivery failure. When a signal appears on lead INH to initiate recycle of a magnet card, binary counter 65 is advanced to a count of one. During recycle operation, as described above, mounting plate 1211 is not indexed upward and thus counter 65 is not reset.

When the magnet card to be recycled is again withdrawn from magazine 1210 onto table 1230, flip-flop 3WDF is set through OR-gate 35. If information recording operation fails on the first recycle attempt, flip-flop 3WDF is again reset to provide a signal on lead INH, energizing relay 9REC in the manner described above and advancing binary counter 65 to a count of two. The magnet card is reinserted into magazine 1210 and withdrawn again onto table 1230 as before, operated contact 2 of relay 9REC preventing mounting plate 1211 from being indexed upward. If processing of the magnet fails a third time, flip-flop 3WDF is again reset to energize relay 9REC and to advance the count in binary counter 65 to three. The resultant output signal on lead RTS energizes relay 6RTS, which locks up through its contact 3 and operated contact 3 of relay SP1. Operated contact 1 of relay 6RTS completes an obvious path to light lamp 5RTSL; and operated contact 2 of relay 6RTS completes a path from ground through operated contact 5 of relay 90PR and contact 2 of switch 8A0–SW on lead TBL to energize relay 9TBL. Relay 9TBL locks up through its contact 1 and contact 2 of switch 8A0–SW.

The break portion of transfer contact 2 of relay 9TBL operates to de-energize relays 5P2, 5BRK1 and 5BRK2, the make portion thereof providing a holding path for relay 5P1. De-energization of relay 5P2, via release of contact 1 thereof, removes power from lead PB.

It should be noted that energization of relay 6RTS, and thus relay 9TBL, occurs at the time the word delivery failure is detected to reset flip-flop 3WDF. Thus until power is removed from lead PB, lead assembly 1250 is driven toward the right, and continues to coast in this direction after power is removed. The normal braking of head assembly 1250, effected through the operation of switch 9RT–SW and relay 8HL, is prevented since power is removed from lead PB prior to the operation of switch 9RT–SW. Accordingly, advantageous utilization is made of the energy stored on filter capacitors 9C1 and 9C2 to brake movement of head assembly 1250 in the absence of power on lead PB. Release of contacts 1 and 2 of relay 5BRK2 complete paths through the windings of relays 9L and 9R, respectively, between capacitors 9C1 and 9C2 and ground. The energy stored on capacitors 9C1 and 9C2 when power is removed from lead PB is sufficient to operate relays 9L and 9F, contacts 1 and 2 thereof shorting out the armature of motor 9HM. Capacitors 9C1 and 9C2 also provide the energy for dynamic braking via obvious paths to the shorting connection across the armature of motor 9HM. The low impedance of the shorting connection discharges capacitors 9C1 and 9C2 quickly, thereby preventing damage to motor 9HM. Relays 9L and 9R release when the energy on capacitors 9C1 and 9C2 has discharged to a level insufficient to maintain relays 9L and 9R operated.

Operated contact 4 of relay 9TBL interrupts the holding path for relay 90PR1, release of contact 2 of which breaks the holding path for relay 90PR. Contact 5 of relay 9TBL completes a path from ground through the break portion of transfer contact 1 of relay 8B0 to energize buzzer 8BZ. Thus system operation is brought to a halt and the audible and visual indications given by buzzer 8BZ and lamp 5RSTL, respectively direct an operator to the trouble. Operation of contact 6 of relay 9TBL enables OR-gates 38 and 39, providing an indication on leads WR and WDF to information control circuit 40 that system operation is stopped for trouble.

Recycle operation is also provided where no signals are generated on lead CT during any pass of a magnet card by transducer head assembly 1250. This may occur, for example, if a magnet card is improperly positioned on table 1230 such that sensing devices 1260 do not move adjacent initializing magnets 1218 on the card. No signals appearing on lead CT, binary counter 60 remains in its initial reset condition, providing a signal through AND-gate 63 on lead NWR to enable AND-gate 30. When head assembly 1250 completes its information recording pass and operates switch 9RT–SW, contact 3 of switch 9RT–SW operates to extend ground to the set terminal of flip-flop 3HL, setting flip-flop 3HL. The output of flip-flop 3HL is directed through enabled AND-gate 30 to set flip-flop 3NWR. The set condition of flip-flop 3NWR is reflected through OR-gate 3INH on lead INH to advance counter 65 and to energize recycle control relay 9REC. This initiates recycle operation in the manner described above.

A check is also made by the system to insure that the correct number of words of information, illustratively sixty-four, have been requested during the processing of a card. Binary counter 60 provides a signal through AND-NOT gate 62 on lead WRS to enable AND-gate 64 until the count in counter 60 is advanced to "65," indicating that sixty-four words of information have been requested. When head assembly 1250 operates switch 9RT-SW, setting flip-flop 3HL, a signal appears on lead SMP to an input of AND-gate 64. If the number of words requested during the pass of head assembly 1250 is different from sixty-four, AND-gate 64 is enabled to provide the signal appearing on lead SMP to lead CTS. Relay 6CTS is energized thereby and locks up through its contact 4 and operated contact 3 of relay 5P1, unless relay 9REC is operated for recycle operation. Operation of contact 3 of relay 9REC prevents energization of relay 6CTS. Operated contact 1 of relay 6CTS completes an obvious path to light lamp 5CTSL; and operated contact 2 of relay 6CTS extends ground through operated contact 5 of relay 90PR, contact 2 of switch 8A0–SW on lead TBL to energize relay 9TBL. Relay 9TBL operates to stop system operation and to energize buzzer 8BZ in the manner described above.

*Timing check of individual card processing*

During the movement of transducer head assembly 1250 from left to right, recording information on a magnet positioned on table 1230, the above-described checks are performed to insure proper system operation. Additionally, timing circuit 5TMR provides a timing check on the movement of head assembly 1250 from left to right. Furthermore, upon completion of information recording operation for each magnet card, timing circuit 5TMR checks against an abnormal length being taken by the system to reinsert the magnet card into magazine 1210 and to withdraw the next magnet card therefrom for processing. So long as a changing signal appears on lead TMR, due to the operation and release of contact 3 of relay 8HL within predetermined timing intervals, timing circuit 5TMR provides a ground signal on lead TO to energize relay 5TO. For example, when contact 3 of relay 8HL operates to remove ground from lead TMR upon completion of information recording operation for each magnet card, timing circuit 5TMR maintains the ground signal on lead TO for a predetermined time interval. If during this predetermined time interval the processed magnet card is reinserted and a subsequent magnet card is withdrawn for processing, the ground signal is reapplied on lead TMR and thus is continued on lead TO to maintain relay 5TO energized. Similarly, when contact 3 of relay 8HL releases to apply ground on lead TMR upon positioning of a magnet card on table 1230 for processing, timing circuit STMR maintains the ground signal on lead TO for a predetermined timing interval. If during this predetermined timing interval head assembly 1250 moves from left to right, operating switch 9RT–SW and thus relay 8HL, the ground signal is removed from lead TMR and ground is continued on lead TO by timing circuit STMR. If timing circuit 5TMR times out before the next magnet card has been withdrawn from magazine 1210 onto table 1230 for processing, or before head assembly 1250 has moved from left to right after a card is positioned for processing, ground is removed from lead TO and relay 5TO is thus de-energized, stopping system operation and providing suitable alarm indications.

Initially, before operation of switch 5WT–SW to start information recording operation, relay 5TO is energized via a path from lead 50 through the winding of relay 5TO, the break portion of transfer contact 3 of relay 9TBL, and the break portion of transfer contact 4 of relay 90PR1 to ground. Upon operation of switch 5WT–SW, and the consequent energization of relay 90PR1, the path just traced is interrupted and ground is extended through the make portion of transfer contact 4 of relay 90PR1 and unoperated contact 3 of relay 8HL on lead TMR to timing circuit 5TMR. Responsive thereto, timing circuit 5TMR provides a ground signal on lead TO for a first predetermined time interval to maintain relay 5TO energized. Upon completion of recording operation of a magnet card during this first predetermined time interval, transducer head assembly 1250 operates switch 9RT–SW to energize relay 8HL. Operation of contact 3 of relay 8HL removes the ground signal from lead TMR to start the timing of a second predetermined time interval by timing circuit 5TMR, ground being maintained thereby on lead TO during the second predetermined time interval.

During the second predetermined time interval provided by timing circuit 5TMR, normal system operation described above calls for the return of head assembly 1250 to its home position, the insertion of the processed magnet card into magazine 1210, and the withdrawal therefrom onto table 1230 of the next subsequent magnet card for processing. When the subsequent magnet card is positioned on table 1230 for processing, finger assembly 1240 operates switch 9BK–SW to de-energize relay 8FB and thus relay 8HL. Release of contact 3 of relay 8HL returns the ground on lead TMR to timing circuit 5TMR to again start the timing of a first predetermined time interval. Thus, if relay 8HL is de-energized during the second predetermined time interval, relay 5TO is maintained energized. If not, indicating that the next subsequent card has not been positioned for processing, timing circuit 5TMR removes the ground from lead TO and relay 5TO is de-energized. Similarly, if relay 8HL is not energized during the first predetermined time interval, timing circuit 5TMR removes ground from lead TO to release relay 5TO. Release of contact 1 of relay 5TO completes an obvious path to light lamp 5TOTL; and release of contact 2 completes a path through contact 5 of relay 90PR and contact 2 of switch 8A0–SW on lead TBL to operate relay 9TBL. Operation of relay 9TBL stops system operation and energizes buzzer 8BZ in the manner described above. If relay 9TBL is energized for some other reason while relay 5TO is energized, relay 5TO is maintained energized via a path through its winding, the make portion of transfer contact 3 of relay 9TBL and operated contact 3 of relay 5TO.

In addition to the checks mentioned above, a check is made preceding the processing of each magnet card and following the processing of all of the cards in one orientation to insure that information control circuit 40 and the information recording operation are in agreement as to the orientation of the cards being processed. Should the recording operation and information control circuit 40 get out of step, system operation is stopped, lamp 50STL is lighted and buzzer 8BZ is energized. Thus, if information control circuit 40 extends ground on lead SP, energizing relay 5SP, at any time prior to processing of the last magnet card 1215, ground is extended through the break portion of transfer contact 3 of relay 50R2 and the make portion of transfer contact 3 of relay 5SP to contact 2 of relay 8UP and to contact 1 of relay 9REC. When relay 8UP is next operated by the indexing of mounting plate 1211 upward, or when relay 9REC is energized for recycle operation, this ground is extended through operated contact 2 of relay 8UP and contact 3 of switch 9END–SW to energize relay 90S.

Relay 90S locks up through its contact 1, and via its contact 2 completes an obvious path to light lamp 50STL. Operated contact 3 of relay 90S completes a path from ground through operated contact 5 of relay 90PR, contact 2 of switch 8A0–SW on lead TBL to energize relay 9TBL. As described above, energization of relay 9TBL stops system operation and energizes buzzer 8BZ.

A similar check is made upon completion of processing all magnet cards in a particular orientation. When switch 9END–SW is operated, contact 1 thereof completes a path to energize relay 90S if the recording operation and control circuit 40 are out of step. As mentioned above, after the 64th word of information is provided by information control circuit 40 for recordation on last magnet card 1215, ground is extended by circuit 40 on lead SP to energize relay 5SP. If relay 5SP has not been energized when switch 9END–SW is operated at the end of orientation "A" processing, a path is completed from lead NB through the winding of relay 90S, the break portion of transfer contact 1 of relay 5SP, the break portion of transfer contact 2 of relay 50R2, and operated contact 1 of switch 9END–SW, energizing relay 90S. Similarly, after the 64th word of information is provided for recordation on last magnet card 1215′, ground is removed from leads IP and SP, de-energizing relays 5SP and 5IP. If either of relays 5SP and 5IP remain energized when switch 9END–SW operates at the completion of orientation "B" processing, a path is completed through make portion of transfer contact 1 thereof and operated contact 1 of switch 9END–SW to energize relay 90S.

*Operator termination of information recording operation*

At any time during the information recording operation the sysetem may be restored to its initial starting condition by operating and releasing switch 9HO–SW. Contact 2 of switch 9HO–SW completes a path which may be traced from lead NB through the winding of relay 8RLD, the break portion of transfer contact 2 of switch 8UP–SW and contact 4 of switch 9END–SW to ground. Relay 8RLD operates in this path and locks up through its contact 1. The card processing operation continues as usual until head assembly 1250 is returned to its home position, the card being processed is reinserted in magazine 1210, and finger assembly 1240 has backed away to operate switch 5CL–SW. At this point relay 8U is normally energized to index mounting plate 1211 upward; however, the operating path therefor is interrupted by the operated transfer contact 2 of relay 8RLD. The make portion of transfer contact 2 of relay 8RLD completes a path to energize relay 8D, the remainder of the path being traced through contact 2 of relay 8FF, contact 4 of relay 8FB, the make portion of transfer contact 2 of switch 5CL–SW, and operated contact 7 of relay 90PR1 to ground. Operation of relay 8D energizes solenoid 8DRL to trip pawls 1221 and 1222, permitting mounting plate 1211 to descend to its home position.

Alternatively, information recording operation may be terminated and the system stopped in place by operating switch 5OFF–SW, which effects the release of switch 5NOR–SW. Lamp 5FNL is lighted via an obvious path completed upon release of contact 1 of switch 5NOR–SW, thereby indicating that the system is in an off-normal condition. Contact 2 of switch 5OFF–SW operates to break the holding path for relay 5PA, lighting lamp 5PAL upon release of contact 1 of relay 5PA. Release of contact 4 of relay 5PA de-energizes relay 5PO, removing power from leads 55 and NB, and consequently from lead PB. Inasmuch as either head assembly 1250 or finger assembly 1240 may be in motion when power is removed from lead PB, provision must be made for braking their motion. Again, advantageous utilization is made of the energy stored on filter capacitors 9C1 and 9C2. Release of contacts 1 and 2 of each of relays 5BRK1 and 5BRK2, upon removal of power from lead 55, complete obvious paths through the windings of relays 9B, 9F, 9L and 9R between capacitors 9C1 and 9C2 and ground. These relays operate to complete previously traced shorting connections across the armature of motors 9FM and 9HM. Energy for dynamic braking is provided by capacitors 9C1 and 9C2 until they have discharged sufficiently to release relays 9B, 9F, 9L and 9R. All system operation is thus stopped, finger assembly 1240, head assembly 1250 and mounting plate 1211 being stopped in their respective positions occupied at the time switch 5OFF–SW was operated.

The system may be returned subsequently to its initial starting condition by releasing switch 5OFF–SW and operating switches 5NOR–SW, 5ST–SW and 9HO–SW. Release of switch 5OFF–SW and operation of switch 5NOR–SW and 5ST–SW establishes paths traced hereinabove to energize relays 5PA, 5P0 and 5M1. It will be assumed first that finger assembly 1240 is stopped in a position such that switch 9FD–SW is not operated. Operation of switch 9HO–SW, via a path completed through contact 4 thereof, energizes relays 5P1, 5P2, 5BRK1 and 5BRK2. This extends power on leads NB and PB, the power on lead NB energizing relay 9HO via a path completed through contact 3 of relay 9OPR1, contact 3 of switch 9FD–SW, operated contact 1 of switch 9HO–SW, contact 2 of switch 9DN–SW and contact 4 of relay 9TBL to ground. Relay 9HO locks up through its contact 1 and one of two paths, depending on the location of head assembly 1250 when stopped. If head assembly 1250 is stopped in any location other than its home position, the locking path for relay 9HO is completed through contact 3 of switch 9LF–SW. If head assembly 1250 is stopped in its home position, relay 9HO locks up through contact 8 of relay 8HL and contact 4 of switch 9FD–SW.

Operated contact 2 of relay 9HO completes a path to energize relay 90PR1, which locks up through its contact 1, contact 3 of switch 9DN–SW and contact 4 of relay 9TBL. If finger assembly 1240 is stopped in its home position, operating switch 9BK–SW, and head assembly 1250 is stopped in any location other than its home position, relays 9R and 9L will operate through transfer contact 9 of relay 8HL, energizing motor 9HM to drive head assembly 1250 to its home position, operating switch 9LF–SW. With both of switches 9LF–SW and 9BK–SW operated, motor 9FM is energized in the normal manner to drive finger assembly 1240 so as to reinsert the card into magazine 1210 and to back away until switch 5CL–SW operates. This completes the path above-traced to energize relay 8D and return mounting plate 1211 to its home position.

If finger assembly 1240 is initially stopped in a position operating switch 5CL–SW, it is uncertain whether finger assembly 1240 was moving toward or away from mounting plate 1211 when stopped. Accordingly, when switch 9HO–SW is operated to energize relay 9HO, a path is completed from lead NB through the winding of relay 8FS, the break portion of transfer contact 3 of relay 8NL, operated contact 3 of relay 9HO and contact 5 of switch 9BK–SW to ground. Relay 8FS is energized in this path, locks up through its contact 1, the break portion of transfer contact 5 of relay 8HL and contact 2 of relay 8FB to ground. Fingers 1241 are thus opened in finger assembly 1240. Contact 2 of relay 8FS operates to complete a path through contact 6 of relay 8HL to energize relay 8FF. Finger assembly 1240 is driven forward in the normal manner to seize a card, switch 9FD–SW operating to release relay 8FS to permit fingers 1241 to close. Operation of contact 4 of switch 9FD–SW deenergizes relay 9HO, release of contact 3 of relay 9HO breaking the operating path for relay 8FS. If a card had been seized and was being withdrawn from magazine 1210 when operation of the system stopped, this card is reseized. The normal cycle of operation continues, the card is withdrawn onto table 1230, a pass is made by head assembly 1250, and the card is reinserted into magazine 1210. Finger assembly is backed away until switch 5CL–SW operates. A previously traced path is then completed through the make portion of transfer contact 2 thereof and the make portion of transfer contact 2 of relay 8RLD to energize relay 8D, returning mounting plate 1211 to its home position.

Assume now that finger assembly 1240 is initially stopped in a position such that switch 9FD–SW is operated. Contact 3 of switch 9FD–SW breaks the operating path for relay 9HO; however, when contact 1 of switch 9HO–SW operates a path is completed through contact 2 of switch 9FD–SW to energize relay 9OPR1. Operated contact 2 of switch 9HO–SW completes a path to energize relay 8RLD, which locks up through its contact 1. Contact 5 of switch 9FD–SW completes a path through the break portion of transfer contact 4 of relay 8HL to energize relay 8FB. The normal manner of system operation ensues to withdraw and reinsert the card in magazine 1210. After the card is reinserted in magazine 1210 and switch 5CL–SW is operated by finger assembly 1240, relay 8D is energized to return mounting plate 1211 to its home position.

It is to be understood that the above-described arrangements are but illustrative of the application of the principles of applicants' invention. Numerous other arrangements may be devised by those skilled in the art without departing from the spirit and scope of the invention.

What is claimed is:

1. An arrangement for recording information on a plurality of information storage cards comprising, a card processing surface, magazine means for disposing said cards in coplanar relationship with said card processing surface, card indexing apparatus including stepping means operative for positioning successive ones of said cards adjacent said card processing surface, card engaging apparatus, means responsive to the operation of said stepping means for operating said card engaging apparatus to withdraw an individual adjacent card from said magazine means onto said card processing surface, means including said card processing surface and said card engaging apparatus for positioning said individual cards for recording information thereon, information recording means responsive to the positioning of a card on said card processing surface for recording information on said card, means for operating said card engaging apparatus to return said card to said magazine means, and means operated by said card engaging apparatus upon return of said card to said magazine means for operating said stepping means.

2. An information recording arrangement in accordance with claim 1 wherein said card engaging apparatus includes means operable for releasably engaging said individual cards wherein said means for operating said card engaging apparatus to withdraw a card from said magazine means comprises means for delaying the operation of said engaging means.

3. An information recording arrangement in accordance with claim 1 further comprising indicator means, and means responsive to the operation of said stepping means upon return of the last successive storage card to said magazine means for returning said magazine means to its starting position and for energizing said indicator means.

4. An arrangement for recording information on a plurality of information storage cards comprising, a card processing surface including means for positioning individual ones of said cards for recording information thereon, means for disposing said cards in coplanar relationship with said card processing surface, means for positioning successive ones of said cards adjacent said card processing surface, card engaging apparatus operable for releasably engaging individual ones of said cards adjacent said card processing surface, means responsive to the operation of said positioning means for driving said card engaging apparatus forward toward said magazine means, means for braking forward motion of said card engaging apparatus when it is positioned for engaging a card adjacent said card processing surface, means for delaying operation of said card engaging apparatus until forward motion thereof has stopped before engaging said card, means for reversing the operation of said driving means to withdraw said engaged card from said magazine means onto said card processing surface, means for braking the reverse operation of said driving means when said engaged card has been positioned on said card processing surface, means responsive to the positioning of said engaged card on said card processing surface for recording information thereon, means for operating said driving means to return said engaged card to said magazine means and for operating said card engaging apparatus to release said engaged card, and means operative upon release of said card by said card engaging apparatus for reversing the operation of said driving means to return said card engaging apparatus to its starting position.

5. An information recording arrangement in accordance with claim 4 further comprising means for delaying the reverse operation of said driving means for a predetermined interval of time after operation of said card engaging apparatus.

6. An arrangement for recording information in discrete magnetic portions of each of a plurality of information storage cards comprising, transducer means, means for moving said transducer means in a predetermined path, means operable for positioning successive ones of said information storage cards such that said discrete magnetic portions thereof are adjacent said predetermined path, means for detecting each of said discrete magnetic portions of a positioned card during movement of said transducer means adjacent thereto, means responsive to said detecting means for energizing said transducer means to record information in said adjacent discrete magnetic portions of said positioned card, means for returning said transducer means to a starting position, means for inhibiting operation of said detecting means during the return of said transducer means to said starting position, and means responsive to the return of said transducer means to said starting position for operating said positioning means.

7. An arrangement for recording information in a plurality of successive discrete magnetic storage portions of an information storage card comprising, movable transducer means, driving means for moving said transducer means in a predetermined path adjacent said successive storage portions of said card, means associated with said transducer means for providing a position indication when said transducer means is adjacent each of said successive storage portions, means responsive to each said position indication for applying an alternating-current signal to said transducer means, means for selectively modifying the signal applied to said transducer means in accordance with the information to be recorded in the storage portion adjacent said transducer means, means operative when said transducer means is between successive ones of said storage portions for removing said signals applied to said transducer means, and means responsive to said last-mentioned means for requesting information to be recorded in the next successive storage portion of said card.

8. An information recording arrangement in accordance with claim 7 further comprising means operative subsequent to the recording of information in the last successive storage portion of said card for operating said driving means in a reverse direction to return said transducer means to its starting position, and means for inhibiting operation of said sensing means during operation of said driving means in said reverse direction.

9. An information recording arrangement in accordance with claim 8 further comprising means for inhibiting operation of said sensing means while said transducer means is in its starting position.

10. An information recording system for magnetically recording information on a plurality of cards each having coordinate rows and columns of discrete magnetic storage elements arranged thereon, the combination comprising, a card processing surface having means for positioning individual ones of said cards for recording information thereon, means for disposing said cards in coplanar relationship with said surface, card engaging apparatus, means for operating said card engaging apparatus to withdraw said cards individually from said disposing means onto said processing surface, a plurality of transducer heads each associated with a respective column of said magnetic storage elements on a card, driving means for providing relative movement between said transducer heads and the respective columns of storage elements of a card positioned on said surface, sensing apparatus for detecting each row of storage elements on said positioned card during said relative movement, means responsive to said sensing apparatus for energizing said transducer heads to record information in said rows of storage elements, means for braking said driving means when information has been recorded in the last row of storage elements on said card and for operating said driving means in a reverse direction, means for inhibiting operation of said sensing apparatus during operation of said driving means in said reverse direction, and means responsive to the return of said transducer heads and said positioned card to their starting position for operating said card engaging apparatus to return said card to said disposing means.

11. An information recording system in accordance with claim 10 wherein said sensing apparatus comprises a plurality of additional magnetic elements individually associated with a respective row of said magnetic storage elements, and means movable with said transducer heads for detecting each of said additional magnetic elements.

12. An information recording system in accordance with claim 11 further comprising means movable with said transducer heads and preceding said sensing means for magnetizing said additional magnetic elements.

13. An information recording system for magnetically recording information on a plurality of cards each having coordinate rows and columns of discrete magnetic storage elements arranged thereon, the combination comprising, means for positioning individual ones of said cards for recording information in said storage elements arranged thereon, a plurality of movable transducers, means for concurrently moving each of said transducers at a substantially constant velocity adjacent respective columns of said storage elements on a card positioned for information recording, means operative for detecting the movement of said transducers adjacent each row of said storage elements, means responsive to the operation of said detecting means for applying a demagnetizing signal in common to each of said transducers, means operative a predetermined interval of time after the application of said demagnetizing signal to said transducers for applying a magnetizing signal to selected ones of said transducers, and means for removing said magnetizing and demagnetizing signals from said transducers during movement of said transducers between said rows of storage elements.

14. An information recording system for recording information on a plurality of information storage cards each having coordinate rows and columns of storage elements arranged thereon comprising, means for supplying information to be recorded, means for positioning individual ones of said cards for recording information in said storage elements thereon, transducer means, means for moving said transducer means adjacent said columns of storage elements on a card positioned for information recording, means for detecting the movement of said transducer means adjacent each successive row of said storage elements, means responsive to said detecting means for energizing said transducer means in accordance with information to be recorded in a row of said storage elements adjacent said transducer means, means operative when said transducer means is between successive rows of said storage elements for requesting information from said information supplying means to be recorded in the next successive row of storage elements on said card, means operable for recycling operation of said information recording system with respect to individual ones of said cards, and means responsive to the failure of said information supplying means to supply said requested information before said next successive row of storage elements is detected by said detecting means for operating said recycling means.

15. An information recording system in accordance with claim 14 further comprising means responsive to the failure of operation of said detecting means during movement of said transducer means adjacent said rows of storage elements on a card for operating said recycling means.

16. An information recording system in accordance with claim 15 wherein said recycling means includes means for operating said positioning means to reposition a card with respect to which operation of said information recording system is to be recycled.

17. An information recording system in accordance with claim 15 further comprising alarm means, and means responsive to a predetermined number of operations of said recycling means with respect to the same one of said cards for terminating operation of said information recording system and for operating said alarm means.

18. An information recording arrangment for recording information on a plurality of information storage cards, each of said storage cards having a plurality of discrete magnetic storage elements arranged thereon in coordinate rows and columns, the combination comprising, magazine means in which said plurality of cards are disposed in coplanar relationship, a card processing surface having means for positioning individual ones of said cards for recording information thereon, magazine indexing apparatus operable for positioning successive ones of said cards adjacent said card processing surface, card engaging apparatus, means for operating said card engaging apparatus to withdraw said successively adjacent cards from said magazine means onto said card processing surface, a plurality of movable transducer heads each associated with a respective column of said magnetic storage elements, means for concurrently driving each of said transducer heads at a substantially constant velocity adjacent the respective columns of storage elements associated therewith on a card positioned on said card processing surface, position sensing apparatus for detecting each row of magnetic storage elements on said positioned card to energize said transducer heads for recording information in said row of storage elements, means for braking forward motion of said driving means when information has been recorded in the last row of magnetic storage elements on said positioned card and for operating said driving means in a reverse direction to return said transducer heads to their starting position, means for inhibiting operation of said position sensing apparatus during the operation of said driving means in said reverse direction, means responsive to the return of said transducer heads to their starting position for operating said card engaging apparatus to return said positioned card to said magazine means, means normally responsive to the return of a card to said magazine means for operating said magazine indexing apparatus to position a successive one of said cards adjacent said card processing surface, and means selectively operable for recycling operation of said information recording arrangement with respect to an information storage card including means for inhibiting operation of said indexing apparatus operating means.

19. An information recording arrangement for recording information on a plurality of information storage cards comprising, a card processing surface, means for disposing said cards in coplanar relationship with said surface, card engaging apparatus, means including first driving means for operating said card engaging apparatus to withdraw and to position said cards individually from said disposing means onto said surface, transducer means, means including second driving means for providing relative movement between said transducer means and a card positioned on said card processing surface, means for energizing said transducer means during said relative movement to record information on said card positioned on said surface, means including said first driving means for operating said card engaging apparatus to return said positioned card to said disposing means, and means selectively operable for terminating operation of said information recording arrangement including means for automatically braking said first and second driving means.

20. An information recording arrangement in accordance with claim 19 further comprising means including capacitive storage means for automatically operating said braking means when power is removed from said information recording arrangement.

References Cited by the Examiner

UNITED STATES PATENTS

| | | | |
|---|---|---|---|
| 1,908,944 | 5/1933 | Baber | 101—66 |
| 3,176,279 | 3/1965 | Lin et al. | 346—74 |

BERNARD KONICK, *Primary Examiner.*

V. P. CANNEY, *Assistant Examiner.*